United States Patent
Kim et al.

(10) Patent No.: US 12,003,866 B2
(45) Date of Patent: Jun. 4, 2024

(54) METHOD FOR PROVIDING IMAGE AND ELECTRONIC DEVICE SUPPORTING THE SAME

(71) Applicant: Samsung Electronics Co., Ltd., Suwon-si (KR)

(72) Inventors: Sungoh Kim, Suwon-si (KR); Valeriy Rushinskiy, Suwon-si (KR); Hyungsok Yeo, Suwon-si (KR); Kihuk Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 65 days.

(21) Appl. No.: 17/967,333

(22) Filed: Oct. 17, 2022

(65) Prior Publication Data

US 2023/0121758 A1  Apr. 20, 2023

Related U.S. Application Data

(63) Continuation of application No. PCT/KR2022/015025, filed on Oct. 6, 2022.

(30) Foreign Application Priority Data

Oct. 20, 2021 (KR) .................. 10-2021-0140395
Dec. 30, 2021 (KR) .................. 10-2021-0193113

(51) Int. Cl.
*H04N 23/80* (2023.01)
*H04N 5/265* (2006.01)
(Continued)

(52) U.S. Cl.
CPC ............. *H04N 23/80* (2023.01); *H04N 5/265* (2013.01); *H04N 23/62* (2023.01); *H04N 23/64* (2023.01)

(58) Field of Classification Search
CPC ........ H04N 23/80; H04N 5/265; H04N 23/62; H04N 23/64; H04N 5/262; H04N 23/63;
(Continued)

(56) References Cited

U.S. PATENT DOCUMENTS 3,814,513 A * 6/1974 Nims ...................... G03B 35/24
353/7
10,762,670 B2 * 9/2020 Tokuchi .................. G06T 11/60
(Continued)

FOREIGN PATENT DOCUMENTS

CN  209419667 U  9/2019
CN  112289210 A  1/2021
(Continued)

OTHER PUBLICATIONS

International Search Report dated Jan. 20, 2023, issued in an International Application No. PCT /KR2022/015025.

*Primary Examiner* — Hung H Lam
(74) *Attorney, Agent, or Firm* — Jefferson IP Law, LLP

(57) ABSTRACT

An electronic device is provided. The electronic device includes a display including a first region being capable of reciprocating, a camera configured to obtain an image using incident light through the first region, a driving part configured to reciprocate the first region, and at least one processor electrically connected to the display, the camera, and the driving part, wherein the at least one processor may be configured to control the driving part such that the first region reciprocates, obtain a plurality of first images through the camera while the first region reciprocates, and obtain a second image by synthesizing the plurality of first images.

20 Claims, 18 Drawing Sheets

(51) Int. Cl.
*H04N 23/60* (2023.01)
*H04N 23/62* (2023.01)

(58) Field of Classification Search
CPC ...... H04N 23/71; H04N 23/667; H04N 23/57; H04N 23/663; H04N 23/75; H04N 23/951; H04N 23/55
See application file for complete search history.

(56) References Cited

U.S. PATENT DOCUMENTS

| | | | |
|---|---|---|---|
| 2010/0111429 A1* | 5/2010 | Wang | H04N 9/646 382/233 |
| 2013/0063614 A1 | 3/2013 | Tsutsumi | |
| 2013/0207998 A1* | 8/2013 | Aoki | G06F 3/0304 345/619 |
| 2016/0286129 A1 | 9/2016 | Martensson et al. | |
| 2017/0034489 A1* | 2/2017 | Lee | G02B 27/646 |
| 2019/0373166 A1 | 12/2019 | Jia | |
| 2020/0195764 A1 | 6/2020 | Xu et al. | |
| 2020/0296493 A1 | 9/2020 | Won et al. | |
| 2021/0058691 A1 | 2/2021 | Kim et al. | |
| 2021/0191552 A1 | 6/2021 | Bok et al. | |
| 2021/0203854 A1 | 7/2021 | Choi | |
| 2023/0172027 A1* | 6/2023 | Hwang | H10K 59/121 257/40 |
| 2023/0300451 A1* | 9/2023 | Cheon | H04M 1/0241 348/240.2 |

FOREIGN PATENT DOCUMENTS

| | | |
|---|---|---|
| JP | 2009-015272 A | 1/2009 |
| KR | 10-2016-0087684 A | 7/2016 |
| KR | 10-2020-0014408 A | 2/2020 |
| KR | 10-2021-0082316 A | 7/2021 |
| KR | 10-2021-0083982 A | 7/2021 |

* cited by examiner

METHOD FOR PROVIDING IMAGE AND ELECTRONIC DEVICE SUPPORTING THE SAME

CROSS-REFERENCE TO RELATED APPLICATION(S)

This application is a continuation application, claiming priority under § 365(c), of an International application No. PCT/KR2022/015025, filed on Oct. 6, 2022, which is based on and claims the benefit of a Korean patent application number 10-2021-0140395, filed on Oct. 20, 2021, in the Korean Intellectual Property Office, and of a Korean patent application number 10-2021-0193113, filed on Dec. 30, 2021, in the Korean Intellectual Property Office, the disclosure of each of which is incorporated by reference herein in its entirety.

TECHNICAL FIELD

The disclosure relates to a method of providing an image and an electronic device supporting the same.

BACKGROUND ART

User demand for an electronic device capable of providing a larger screen with a small size and capable of providing a beautiful appearance is increasing. In order to meet this user demand, an electronic device that has a notch, a U-shaped hole, a V-shaped hole, or an O-shaped hole formed in a portion of a housing (or a portion of a display) and includes a camera module exposed to the outside through the formed notch or hole has been introduced.

Recently, in order to realize a full screen, under-display camera (UDC) technology in which a camera is disposed under an active region of a display has been implemented in an electronic device.

The above information is presented as background information only to assist with an understanding of the disclosure. No determination has been made, and no assertion is made, as to whether any of the above might be applicable as prior art with regard to the disclosure.

DETAILED DESCRIPTION OF THE INVENTION

Technical Problem

In the case where an electronic device is implemented with under-display camera (UDC) technology, the transmittance of light entering the camera through a display may be lower than the transmittance of light entering the camera through a hole (e.g., a U-shaped hole, a V-shaped hole, or an O-shaped hole) due to an opaque configuration (e.g., a substrate made of polyimide) included in the display.

In addition, in an electronic device implemented by UDC technology, a light-emitting unit (e.g., a red-green-blue (RGB) pixels) and wires for transmitting signals (e.g., data signals, power, driving signals, and/or control signals) to the light-emitting unit may be disposed in a UDC region corresponding to the camera (e.g., the region through which light passes in the display such that the light is transmitted to the camera) in the display. The light entering the camera through the UDC region may be diffracted by the light-emitting unit disposed in the UDC region and/or at least some of the wires disposed in the UDC region so that the quality of an image obtained through the camera may deteriorate. For example, artifacts such as flare (e.g., light splitting and/or light blurring) may occur in the image obtained through the camera.

Aspects of the disclosure are to address at least the above-mentioned problems and/or disadvantages and to provide at least the advantages described below. Accordingly, an aspect of the disclosure is to provide a method of providing an image by obtaining at least one image through a camera while the UDC region corresponding to the camera is reciprocating (e.g., vibrating) in a display and synthesizing the at least one obtained image, thereby obtaining an image in which artifacts are minimized (or removed), and an electronic device supporting the same.

The technical problems to be solved by the disclosure are not limited to the technical problems mentioned above, and other technical problems that are not mentioned will be clearly understood by those of ordinary skill in the art to which the disclosure belongs from the description below.

Additional aspects will be set forth in part in the description which follows and, in part, will be apparent from the description, or may be learned by practice of the presented embodiments.

Technical Solution

In accordance with an aspect of the disclosure, an electronic device is provided. The electronic device includes a display including a first region being capable of reciprocating, a camera module configured to obtain an image using incident light passing through the first region, a driving part configured to reciprocate the first region, and at least one processor electrically connected to the display, the camera module, and the driving part, wherein the at least one processor may be configured to control the driving part such that the first region reciprocates, obtain a plurality of first images through the camera module while the first region reciprocates, and obtain a second image by synthesizing the plurality of first images.

In accordance with another aspect of the disclosure, a method of providing an image in an electronic device is provided. The method includes controlling a driving part of the electronic device such that the first region reciprocates, the driving part being configured to reciprocate a first region included in the electronic device, obtaining a plurality of first images through a camera module of the electronic device, the camera module being configured to obtain an image using incident light passing through the first region, while the first region is reciprocating, and obtaining a second image by synthesizing the plurality of first images.

In accordance with another aspect of the disclosure, an electronic device is provided. The electronic device includes a display including a first region being capable of reciprocating and a second region having a lower pixels per inch (PPI) than a PPI of the first region, a camera module disposed under the first region and configured to obtain an image using incident light passing through the first region, a wire configured to connect the first region and the second region, a driving part configured to reciprocate the first region, an elastic member configured to allow the first region to move, and a support member to which the elastic member and/or the driving part are attached.

Advantageous Effects

A method of providing an image and an electronic device supporting the same according to various embodiments may obtain at least one image through a camera while the UDC region corresponding to the camera is reciprocating (e.g., vibrating) in a display and synthesize the at least one obtained image, thereby obtaining an image in which artifacts are minimized (or removed).

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

MODE FOR CARRYING OUT THE INVENTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
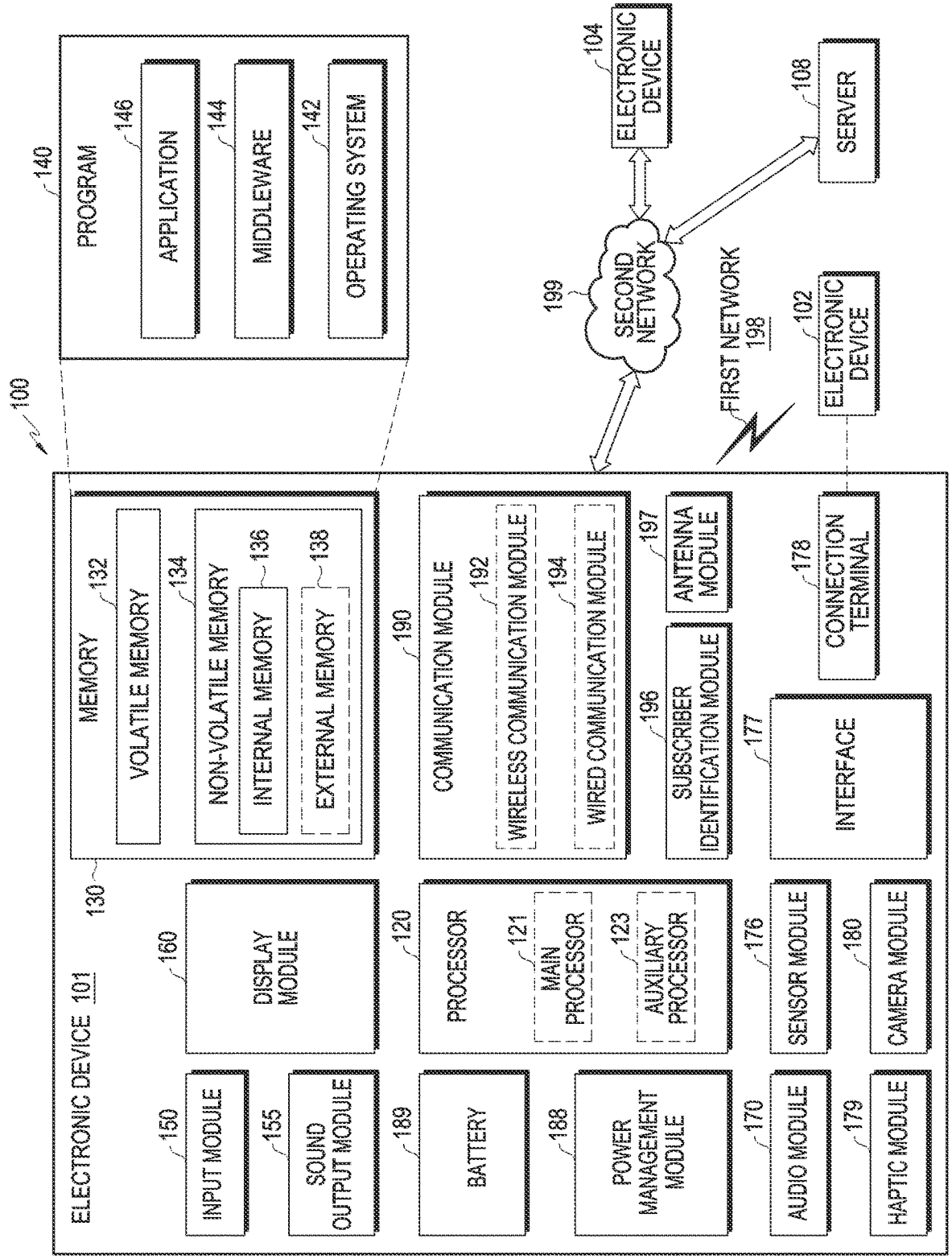
FIG. 1 is a block diagram of an electronic device in a network environment according to an embodiment of the disclosure.

FIG. 1 is a block diagram illustrating an electronic device in a network environment according to an embodiment of the disclosure.

Referring to FIG. 1, the electronic device 101 in a network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control, for example, at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active (e.g., executing an application) state. According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence model is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or an external electronic device (e.g., an electronic device 102 (e.g., a speaker or a headphone)) directly or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN))). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the external electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2$^{nd}$," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively," as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry." A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components or operations may be omitted, or one or more other components or operations may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
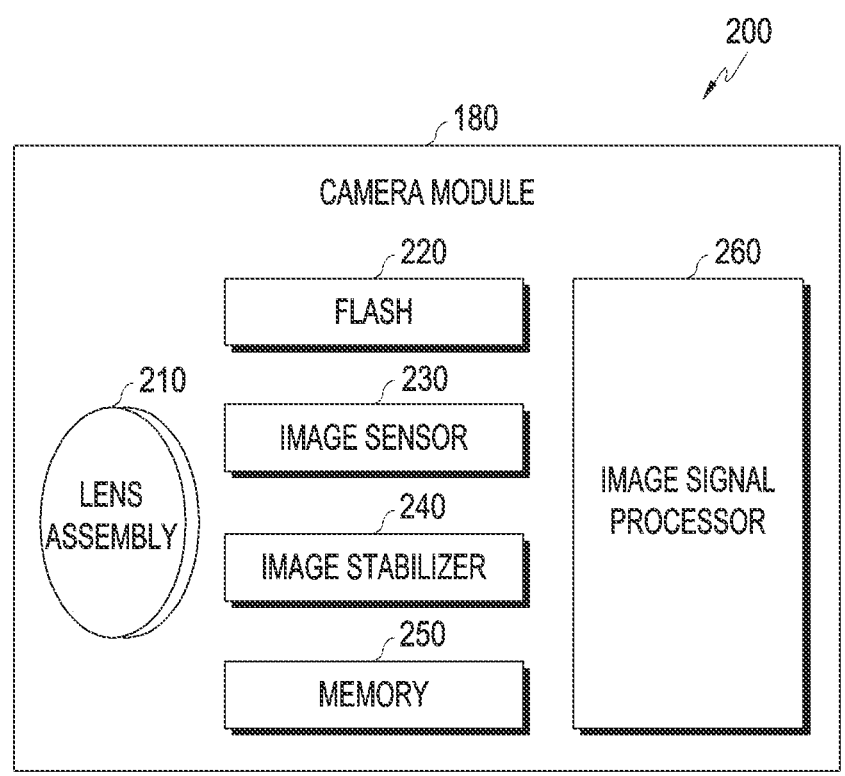
FIG. 2 is a block diagram illustrating a camera module according to an embodiment of the disclosure.

FIG. 2 is a block diagram 200 illustrating the camera module 180 according to an embodiment of the disclosure.

Referring to FIG. 2, a camera module 180 may include a lens assembly 210, a flash 220, an image sensor 230, an image stabilizer 240, memory 250 (e.g., buffer memory), or an image signal processor 260.

The lens assembly 210 may collect light emitted or reflected from an object whose image is to be taken. The lens assembly 210 may include one or more lenses. According to an embodiment, the camera module 180 may include a plurality of lens assemblies 210. In such a case, the camera module 180 may form, for example, a dual camera, a 360-degree camera, or a spherical camera. Some of the plurality of lens assemblies 210 may have the same lens attribute (e.g., view angle, focal length, auto-focusing, f number, or optical zoom), or at least one lens assembly may have one or more lens attributes different from those of another lens assembly. The lens assembly 210 may include, for example, a wide-angle lens or a telephoto lens.

The flash 220 may emit light that is used to reinforce light reflected from an object. According to an embodiment, the flash 220 may include one or more light emitting diodes (LEDs) (e.g., a red-green-blue (RGB) LED, a white LED, an infrared (IR) LED, or an ultraviolet (UV) LED) or a xenon lamp. The image sensor 230 may obtain an image corresponding to an object by converting light emitted or reflected from the object and transmitted via the lens assembly 210 into an electrical signal.

According to an embodiment, the image sensor 230 may include one selected from image sensors having different attributes, such as a RGB sensor, a black-and-white (BW) sensor, an IR sensor, or a UV sensor, a plurality of image sensors having the same attribute, or a plurality of image sensors having different attributes. Each image sensor included in the image sensor 230 may be implemented using, for example, a charged coupled device (CCD) sensor or a complementary metal oxide semiconductor (CMOS) sensor.

The image stabilizer 240 may move the image sensor 230 or at least one lens included in the lens assembly 210 in a particular direction, or control an operational attribute (e.g., adjust the read-out timing) of the image sensor 230 in response to the movement of the camera module 180 or the electronic device 101 including the camera module 180.

This allows compensating for at least part of a negative effect (e.g., image blurring) by the movement on an image being captured. According to an embodiment, the image stabilizer 240 may sense such a movement by the camera module 180 or the electronic device 101 using a gyro sensor (not shown) or an acceleration sensor (not shown) disposed inside or outside the camera module 180. According to an embodiment, the image stabilizer 240 may be implemented, for example, as an optical image stabilizer.

The memory 250 may store, at least temporarily, at least part of an image obtained via the image sensor 230 for a subsequent image processing task. For example, if image capturing is delayed due to shutter lag or multiple images are quickly captured, a raw image obtained (e.g., a Bayer-patterned image, a high-resolution image) may be stored in the memory 250, and its corresponding copy image (e.g., a low-resolution image) may be previewed via the display module 160. Thereafter, if a specified condition is met (e.g., by a user's input or system command), at least part of the raw image stored in the memory 250 may be obtained and processed, for example, by the image signal processor 260. According to an embodiment, the memory 250 may be configured as at least part of the memory 130 or as a separate memory that is operated independently from the memory 130.

The image signal processor 260 may perform one or more image processing with respect to an image obtained via the image sensor 230 or an image stored in the memory 250. The one or more image processing may include, for example, depth map generation, three-dimensional (3D) modeling, panorama generation, feature point extraction, image synthesizing, or image compensation (e.g., noise reduction, resolution adjustment, brightness adjustment, blurring, sharpening, or softening). Additionally or alternatively, the image signal processor 260 may perform control (e.g., exposure time control or read-out timing control) with respect to at least one (e.g., the image sensor 230) of the components included in the camera module 180. An image processed by the image signal processor 260 may be stored back in the memory 250 for further processing, or may be provided to an external component (e.g., the memory 130, the display module 160, the electronic device 102, the electronic device 104, or the server 108) outside the camera module 180. According to an embodiment, the image signal processor 260 may be configured as at least part of the processor 120, or as a separate processor that is operated independently from the processor 120. If the image signal processor 260 is configured as a separate processor from the processor 120, at least one image processed by the image signal processor 260 may be displayed, by the processor 120, via the display module 160 as it is or after being further processed.

According to an embodiment, the electronic device 101 may include a plurality of camera modules 180 having different attributes or functions. In such a case, at least one of the plurality of camera modules 180 may form, for example, a wide-angle camera and at least another of the plurality of camera modules 180 may form a telephoto camera. Similarly, at least one of the plurality of camera modules 180 may form, for example, a front camera and at least another of the plurality of camera modules may form a rear camera.

Figure 3:
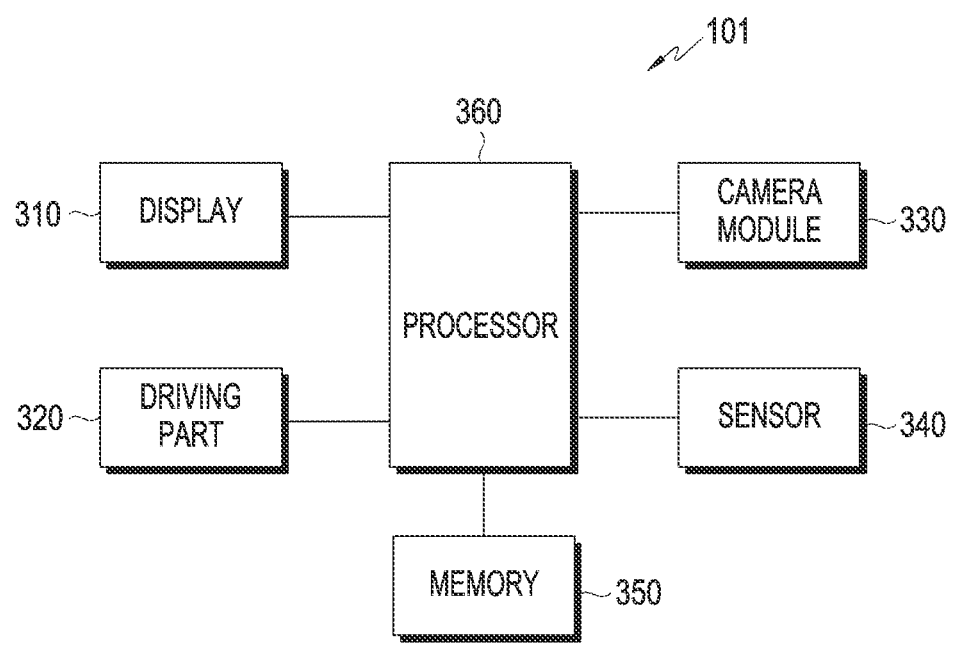
FIG. 3 is a block diagram of an electronic device according to an embodiment of the disclosure.

FIG. 3 is a block diagram of an electronic device according to an embodiment of the disclosure.

Figure 4:
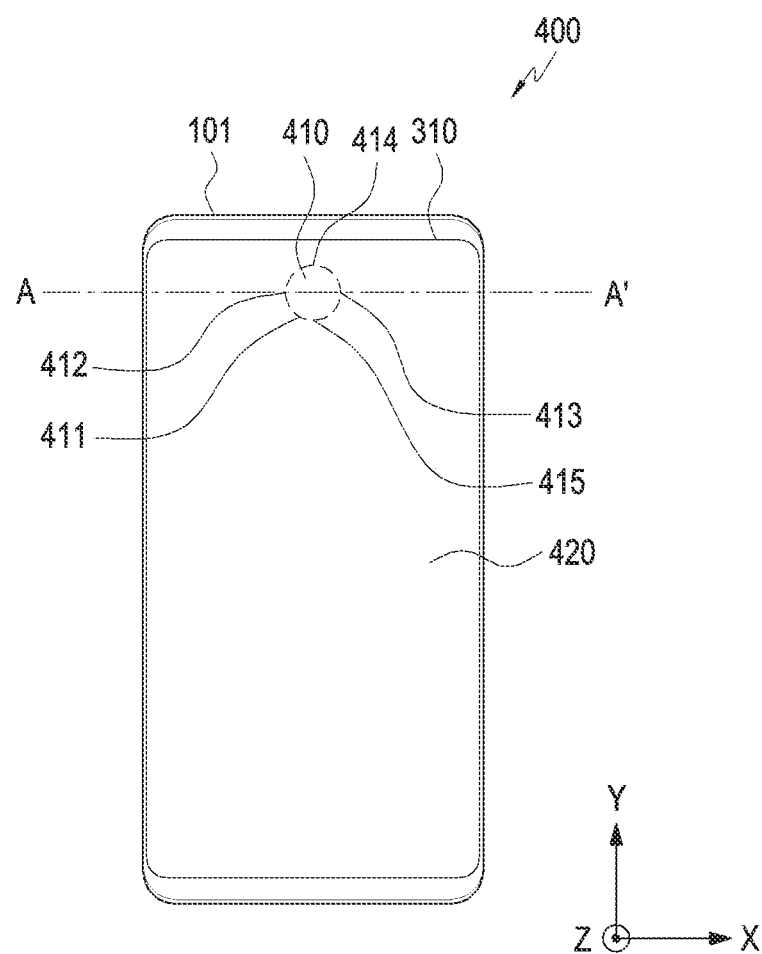
FIG. 4 is a diagram illustrating a display according to an embodiment of the disclosure.

FIG. 4 is a diagram illustrating a display according to an embodiment of the disclosure.

Figure 5A:
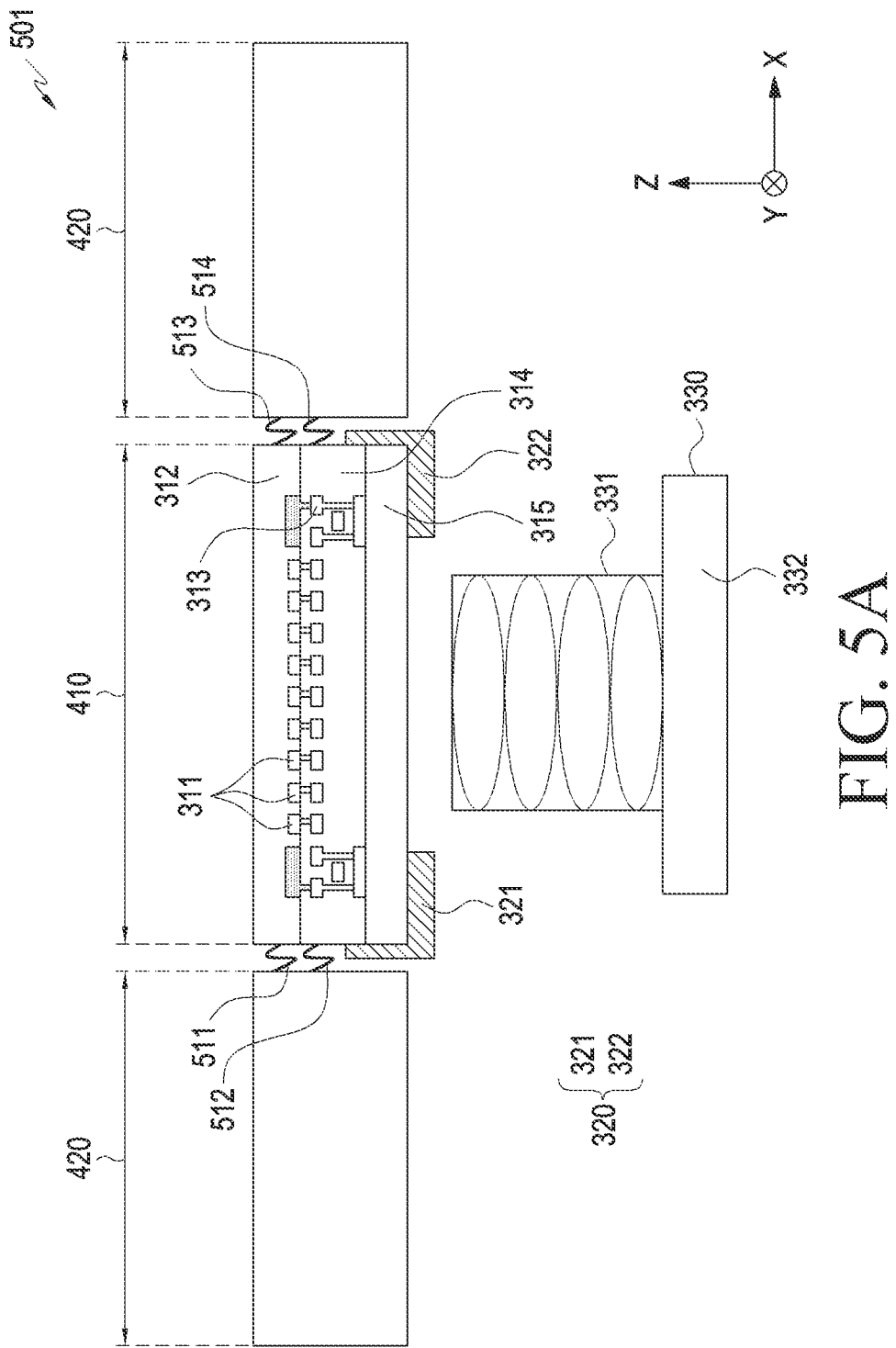
FIGS. 5A, 5B, and 5C are diagrams illustrating a display, a driving part, and a camera module according to various embodiments of the disclosure.
Figure 5B:
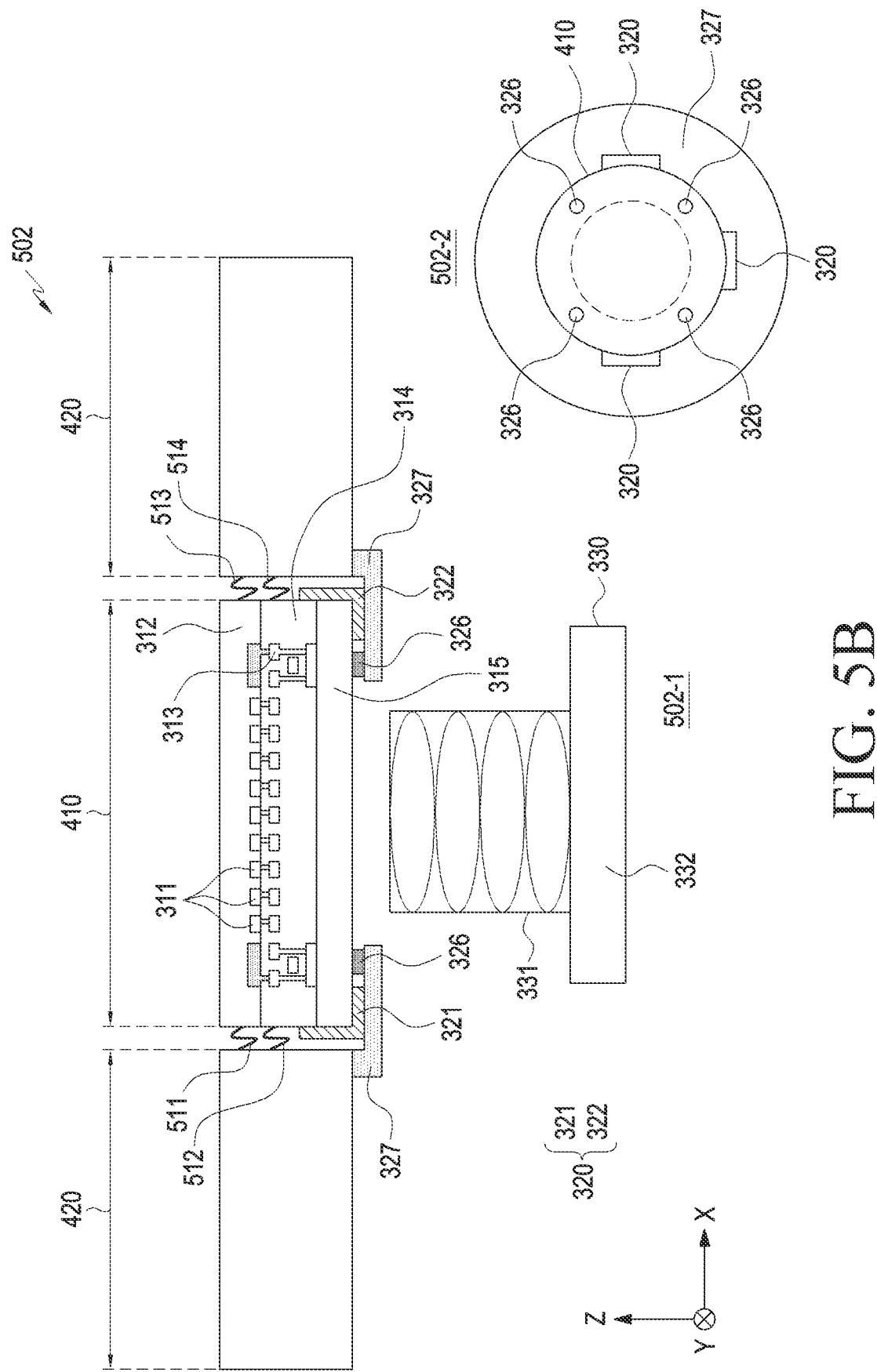
Figure 5C:
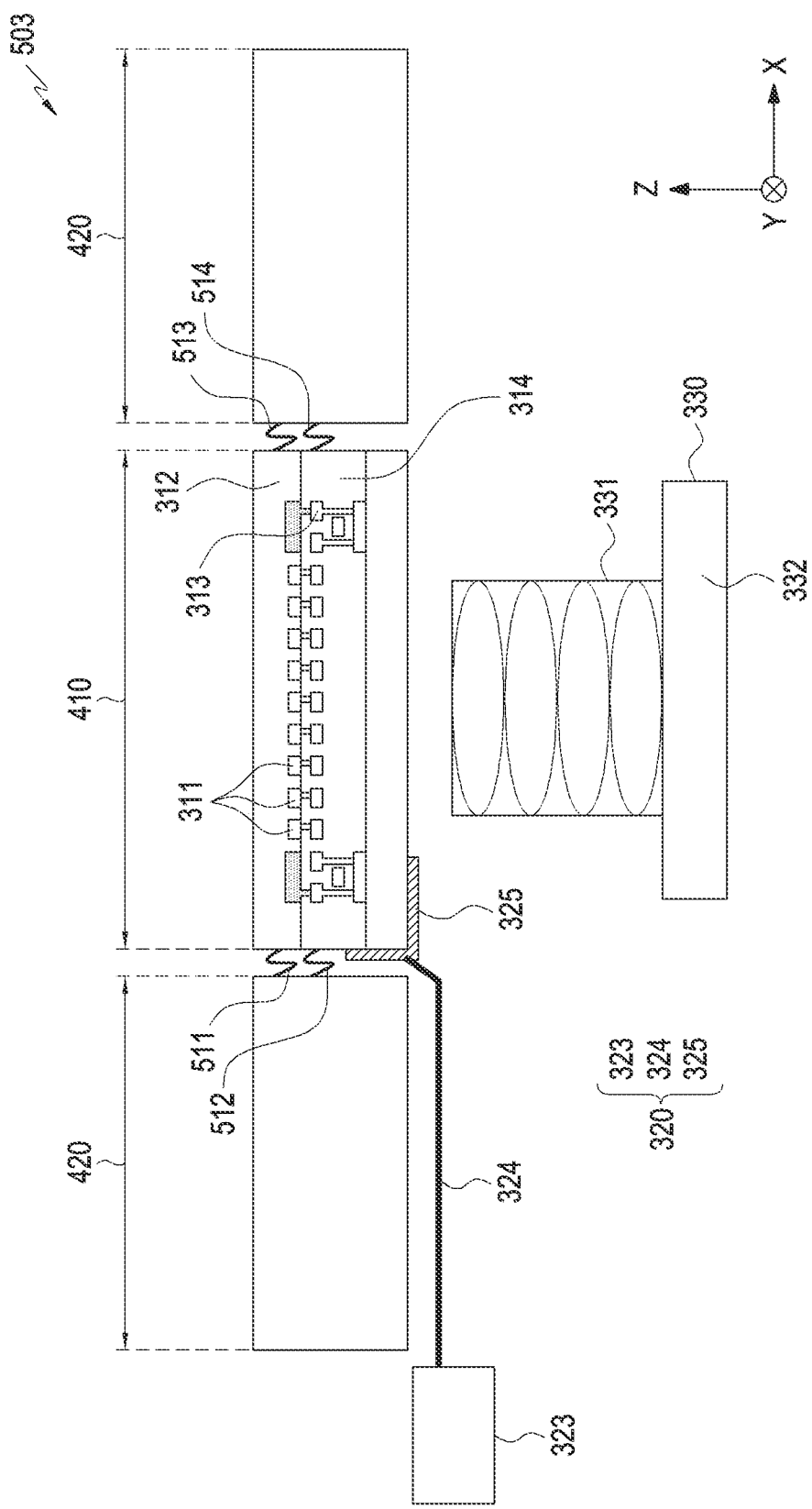

FIGS. 5A, 5B, and 5C are diagrams illustrating a display, a driving part, and a camera module according to various embodiments of the disclosure.

Referring to FIGS. 3, 4, 5A, 5B, and 5C, in an embodiment, an electronic device 101 may include a display 310, a driving part 320, a camera module 330, a sensor 340, a memory 350, and/or a processor 360.

In an embodiment, the display 310 may be included in the display module 160 in FIG. 1.

In an embodiment, as shown in FIG. 4 depicting diagram 400, the display 310 may include a plurality of regions (e.g., an under-display camera (UDC) region 410 and a non-UDC region 420) in order to implement the electronic device 101 by under-display camera (UDC) technology.

In one embodiment, the display 310 may include a UDC region 410 (hereinafter referred to as a "UDC region") that transmits light so as to enter the camera module 330 from the outside in order to obtain an image and is disposed at a position corresponding to the position of the camera in the display 310.

In an embodiment, the UDC region 410 may be activated or deactivated based on whether or not an application related to the camera is executed. For example, if an application related to the camera is executed in the electronic device 101, the UDC region 410 (e.g., a plurality of pixels (e.g., RGB pixels) included in the UDC region 410) may be turned off under the control of the processor 360. As another example, if an application for displaying a screen is executed in the electronic device 101, the UDC region 410 may be turned on under the control of the processor 360 together with a region other than the UDC region 410 in the display 310 (hereinafter, referred to as a "non-UDC (non-under-display camera) region 420") in order to display a screen.

Although it is illustrated in FIG. 4 that the display 310 includes one UDC region, the disclosure is not limited thereto. For example, the electronic device 101 may be implemented such that the display 310 includes a plurality of UDC regions. In addition, although the UDC region 410 is illustrated to have a circular shape in FIG. 4, the UDC region 410 may be implemented in various shapes (e.g., a rectangular shape).

In an embodiment, FIG. 5A depicting diagram 501, reference numeral 502-1 in FIG. 5B depicting diagrams 502, and FIG. 5C depicting diagram 503 may represent a cross-section of the electronic device 101 taken along line A-A' in the electronic device in FIG. 4.

In an embodiment, as shown in FIG. 5A, reference numeral 502-1 in FIG. 5B, and FIG. 5C, the display 310 may include a UDC region 410 and a non-UDC region 420.

In an embodiment, the UDC region 410 may include a light-emitting unit (e.g., a plurality of pixels 311), an encapsulation layer 312, a transistor 313 (e.g., a thin-film transistor (TFT)), an insulating layer 314, and/or a substrate 315.

In an embodiment, the light-emitting unit may include a plurality of pixels 311 including light-emitting devices (e.g., organic electroluminescence (EL)). In an embodiment, the organic EL may be a device capable of generating light when holes and electrons are injected from an anode and a cathode.

In an embodiment, the encapsulation layer 312 (e.g., thin-film encapsulation (TFE)) may be a layer in which organic and inorganic layers are alternately covered on the light-emitting unit to protect the light-emitting device from oxygen or moisture. For example, the encapsulation layer 312 may be a pixel protective layer for protecting the plurality of pixels 311. For example, the encapsulation layer 312 may include encapsulation glass.

In an embodiment, the transistor 313 may include TFT devices for driving the plurality of pixels 311 of the light-emitting unit. In an embodiment, the TFT devices may be a light-emitting circuit for transmitting power, driving signals, and/or control signals to the plurality of pixels 311 of the light-emitting unit. Although FIGS. 5A to 5C illustrate that the transistor 313 is disposed in the UDC region 410, the disclosure is not limited thereto. For example, the display 310 may be implemented such that the transistor 313 is disposed in the non-UDC region 420. In the case where the transistor 313 is disposed in the non-UDC region 420, the light-emitting unit (e.g., a plurality of pixels 311) may receive a data signal (e.g., a data voltage and/or a data current) from the transistor 313 through wires (e.g., the wires 511, 512, 513, and 514) electrically connecting the transistor 313 and the light-emitting unit.

In an embodiment, the insulating layer 314 may be a configuration for electrically separating upper and lower layers.

In an embodiment, the substrate 315 may configure a lowermost layer of the UDC region 410 and the non-UDC region 420. The substrate 315 may be formed of glass or polyimide (PI).

Although FIGS. 5A to 5C illustrate that the UDC region 410 includes the light-emitting unit (e.g., a plurality of pixels 311), the encapsulation layer 312, the transistor 313 (e.g., a thin-film transistor (TFT)), the insulating layer 314, and/or the substrate 315, the disclosure is not limited thereto. For example, the UDC region 410 may further include at least one element (or layer) that is not shown in FIGS. 5A to 5C.

In an embodiment, although not shown in FIGS. 5A to 5C, the non-UDC region 420 may include substantially the same elements as those of the UDC region 410 or additional elements. A detailed description of the elements included in the non-UDC region 420 will be omitted.

In an embodiment, the pixels per inch (PPI) of the UDC region 410 (e.g., the number of pixels per unit area) may be less than the PPI of the non-UDC region 420. However, the disclosure is not limited thereto, and the PPI of the UDC region 410 and the PPI of the non-UDC region 420 may be the same.

In an embodiment, the UDC region 410 may be a region capable of reciprocating (e.g., linearly reciprocating). For example, the UDC region 410 may reciprocate in a direction perpendicular to the surface on which the display 310 is visually exposed to the outside (e.g., along the Z-axis). As another example, the UDC region 410 may reciprocate in a direction parallel to the surface on which the display 310 is visually exposed to the outside (e.g., along the X-axis and/or Y-axis). However, the direction in which the UDC region 410 moves is not limited to the above-described examples. Hereinafter, for convenience of description, an operation in which the UDC region 410 reciprocates will be interchangeably used with an "operation in which the UDC region 410 vibrates."

In an embodiment, the non-UDC region 420 may be a region that does not vibrate. For example, while the UDC region 410 reciprocates, the non-UDC region 420 may not reciprocate. In an embodiment, the UDC region 410 and the non-UDC region 420 may be electrically connected through wires 511, 512, 513, and 514. The wires 511, 512, 513, and 514 may be configured by a flexible material (e.g., a rubber material or a flexible plastic material) such that the non-UDC region 420 does not vibrate while the UDC region 410 reciprocates (the vibration of the UDC region 410 does not affect the non-UDC region 420).

In an embodiment, the driving part 320 may be a configuration to cause the UDC region 410 of the display 310 to reciprocate (vibrates). In an embodiment, the driving part 320 may generate a driving force and cause the UDC region 410 to vibrate by the generated driving force. For example, the driving part 320 may include a driving motor for generating the driving force and coupling members coupled to (e.g., in contact with) the UDC region 410 to vibrate the UDC region 410 using the generated driving force. However, the configurations included in the driving part are not limited to the aforementioned driving motor and coupling members.

In an embodiment, the driving part 320 may be configured independently of a vibration module (e.g., the haptic module 179 in FIG. 1) for vibrating the electronic device 101. The driving part 320 may be configured independently of the vibration module and dedicated to vibrate the UDC region 410 of the display 310. For example, the driving part 320 may include elements 321 and 322 that are coupled to (in contact with) the UDC region 410 for vibrating only the UDC region 410 as shown in FIG. 5A. In an embodiment, the vibration module (e.g., the haptic module 179 in FIG. 1) for vibrating the electronic device 101 may be a configuration for vibrating at least a portion of the electronic device 101 when an event (e.g., an event related to phone call reception, an event related to message reception, or an event related to notification) occurs in the electronic device 101.

In an embodiment, the driving part 320 may generate a movement in a specific direction, based on a control signal received from the processor 360. In an embodiment, the driving part 320 may be implemented as a voice coil motor (VCM) or micro-electromechanical systems (MEMS). In an embodiment, the driving part 320 may include a fixed part that is a reference for movement and a moving part that is displaced by movement. In an embodiment, the driving part 320 may generate a reciprocating motion for a specific period (or at a specific frequency).

In an embodiment, the electronic device 101 may further include an element related to vibration of the UDC region 410 in addition to the driving part 320. For example, as shown by reference numeral 502-1 and reference numeral 502-2 in FIG. 5B, the electronic device 101 may further include an elastic member 326 and a support member 327. In an embodiment, reference numeral 502-2 may denote a plan view of the driving part 320, the UDC region 410, the elastic member 326, and the support member 327 when reference numeral 502-1 is viewed in the −Z axis direction.

In an embodiment, the UDC region 410 may be fixed to the elastic member 326 to be movable. The elastic member 326 may provide a damping effect and an effect of maintaining the movable UDC region 410 so as not to depart from a certain range of positions. In an embodiment, the elastic member 326 may be made of an elastic material capable of contracting or expanding in a movable range (e.g., about 10 μm to about 100 μm) of the UDC region 410. In an embodiment, the elastic member 326 may include a spring made of epoxy or a metal material. In an embodiment, the UDC region 410 and/or the support member 327 may have a protrusion or groove formed to receive the elastic member 326.

In an embodiment, as shown by reference numeral 502-1 and reference numeral 502-2, the elastic member 326 may be disposed on the same plane as the driving part 320 (e.g., the elements 321 and 322) as shown by reference numeral 502-2. However, the disclosure is not limited thereto, and the elastic member 326 may be disposed below the driving part 320.

In an embodiment, the support member 327 may be disposed between the UDC region 410 and the non-UDC region 420. In an embodiment, the driving part 320 and/or the elastic member 326 may be attached to the support member 327.

In an embodiment, as shown by reference numeral 502-2, in the support member 327, one of the fixed part or the moving part of the driving part 320 may be attached to the support member 327, and the remaining one thereof may be attached to the UDC region 410. The support member 327 may prevent the wires (e.g., the wires 511, 512, 513, and 514) from breaking or departing from a specified position due to sagging of the UDC region 410 in the direction toward the camera module 330 by gravity or external force (e.g., external impact).

In an embodiment, the driving part 320 may include a vibration module (e.g., the haptic module 179 in FIG. 1) for vibrating the electronic device 101. For example, the driving part 320, as shown in FIG. 5C, may include a vibration module 323, a coupling member 325 coupled to (e.g., in contact with) the UDC region 410 to vibrate the UDC region 410, and a connection member 324 for connecting the vibration module 323 and the coupling member 325 to transmit a driving force (or vibration) from the vibration module 323 to the coupling member 325.

In an embodiment, the driving part 320 may be implemented such that the UDC region 410 vibrates in at least one direction.

In an embodiment, the driving part 320 may be implemented such that the UDC region 410 vibrates in a direction perpendicular to the surface on which the display 310 is visually exposed to the outside (e.g., along the Z-axis). For example, the driving part 320 may be implemented to vibrate the UDC region 410 such that the UDC region 410 is bent alternately in the +Z-axis direction and the −Z-axis direction (hereinafter referred to as a "first vertical vibration form"), based on an edge (border) of the UDC region 410 (e.g., the portion indicated by the dotted line 411 in FIG. 4) (e.g., without moving the edge of the UDC region 410 in the +Z-axis direction and the −Z-axis direction). As another example, the driving part 320 may be implemented to vibrate the UDC region 410 such that the UDC region 410 is bent alternately in the +Z-axis direction and the −Z-axis direction (hereinafter referred to as a "second vertical vibration form"), based on both ends (e.g., points 412 and 413 or points 414 and 415) of the UDC region 410 (e.g., without moving the both ends of the UDC region 410 in the +Z-axis direction and the −Z-axis direction). As another example, the driving part 320 may be implemented to vibrate the UDC region 410 such that the UDC region 410 linearly moves alternately in the +Z-axis direction and the −Z-axis direction without bending the UDC region 410 (hereinafter referred to as a "third vertical vibration form").

In an embodiment, the driving part 320 may be implemented to vibrate the UDC region 410 in a direction parallel to the surface on which the display 310 is visually exposed to the outside (e.g., along the X-axis and/or the Y-axis). For example, the driving part 320 may be implemented to vibrate the UDC region 410 such that the UDC region 410 linearly moves alternately in the +X-axis direction and the −X-axis direction (hereinafter, referred to as a "first horizontal vibration form"). As another example, the driving part 320 may be implemented to vibrate the UDC region 410 such that the UDC region 410 linearly moves alternately in the +Y-axis direction and the −Y-axis direction (hereinafter, referred to as a "second horizontal vibration form").

However, the form in which the driving part 320 vibrates the UDC region 410 is not limited to the above-described examples. For example, the driving part 320 may be implemented to vibrate the UDC region 410 such that the UDC region 410 is bent alternately in the +Z-axis direction and the −Z-axis direction, based on points that are on the dotted line 411 and have a connecting line therebetween parallel to the diagonal direction of the X-axis and Y-axis, instead of the points 412 and 413 having a connecting line therebetween parallel to the X-axis or the points 414 and 415 having a connecting line therebetween parallel to the Y-axis, in the second vertical vibration form. As another example, the driving part 320 may be implemented to vibrate the UDC region 410 such that the UDC region 410 linearly moves alternately in the diagonal direction of the X-axis and Y-axis, which is parallel to the surface on which the display 310 is visually exposed to the outside.

In an embodiment, the driving part 320 may be implemented such that the UDC region 410 vibrates in a combination form of the vertical vibration forms (e.g., the first vertical vibration, the second vertical vibration form, or the third vertical form), the first horizontal vibration form, and the second horizontal vibration form under the control of the processor 360. For example, the driving part 320 may be implemented such that the UDC region 410 vibrates in the first horizontal vibration form for a first time and such that the UDC region 410 vibrates in the second horizontal vibration form for a second time subsequent to the first time under the control of the processor 360.

In an embodiment, the driving part 320 may be implemented such that the direction in which the UDC region 410 vibrates varies depending on the directions of the wires (e.g., the wires connecting a plurality of pixels 311 of the light-emitting unit included in the UDC region 410 and/or the wires connecting the light-emitting unit included in the UDC region 410 and the elements included in the non-UDC region 420). For example, in the case where the UDC region 410 is be implemented such that the wires included in the UDC region 410 are arranged in a first direction (e.g., the X-axis direction) (e.g., the +X-axis and the −X-axis direction), the driving part 320 may be implemented such that the UDC region 410 vibrates in the Y-axis direction (e.g., the +Y-axis direction and the −Y-axis direction) perpendicular to the first direction (such that the UDC region 410 vibrates in the second horizontal vibration form). As another example, in the case where the UDC region 410 is implemented such that the wires included in the UDC region 410 are arranged in a second direction (e.g., the Y-axis direction), the driving part 320 may be implemented such that the UDC region 410 vibrates in the X-axis direction (e.g., the +X-axis direction and the −X-axis direction) perpendicular to the second direction (such that the UDC region 410 vibrates in the first horizontal vibration form). As another example, in the case where the UDC region 410 is implemented such that the wires included in the UDC region 410 are arranged in the first direction (e.g., the X-axis direction), the driving part 320 may be implemented such that the UDC region 410 vibrates to be alternately bent in the +Z-axis direction and the −Z-axis direction, based on the points 414 and 415 having a connecting line therebetween perpendicular to the Y-axis direction. As another example, in the case where the UDC region 410 is implemented such that the wires included in the UDC region 410 are arranged in the second direction (e.g., the Y-axis direction), the driving part 320 may be implemented such that the UDC region 410 vibrates to be alternately bent in the +Z-axis direction and the −Z-axis direction, based on the points 412 and 413 having a connecting line therebetween perpendicular to the Y-axis direction. As another example, in the case where the UDC region 410 is implemented such that the wires included in the UDC region 410 are arranged in a lattice in the first direction (e.g., the X-axis direction) and the second direction (e.g., the Y-axis direction), the driving part 320 may be implemented such that the UDC region 410 vibrates to be alternately bent in the +Z-axis direction and the −Z-axis direction (the first vertical vibration form), based on the edge of the UDC region 410 (e.g., the portion indicated by the dotted line 411 in FIG. 4). As another example, in the case where the UDC region 410 is implemented such that the wires included in the UDC region 410 are arranged in a lattice in the first direction (e.g., the X-axis direction) and the second direction (e.g., the Y-axis direction), the driving part 320 may be implemented such that the UDC region 410 vibrates in the first horizontal vibration form for a first time and such that the UDC region 410 vibrates in the second horizontal vibration form for a second time subsequent to the first time.

However, the manner in which the driving part 320 vibrates the UDC region 410 depending on the direction of the wire included in the UDC region 410 is not limited to the above-described examples.

In an embodiment, the driving part 320 may be implemented such that the UDC region 410 vibrates for a vibration time (e.g., a vibration period and/or the total time of vibration) and/or at a vibration magnitude (e.g., a vibration amplitude) under the control of the processor 360.

In an embodiment, the camera module 330 may be included in the camera module 180 in FIGS. 1 and 2.

In an embodiment, the camera module 330 may be disposed on the rear surface of the display 310 that is not visually exposed to the outside. In an embodiment, the camera module 330 may be disposed at a position corresponding to the position of the UDC region 410. For example, as shown in FIGS. 5A and 5B, the camera module 330 (e.g., the lens 331 (e.g., the lens assembly 210 in FIG. 2)) and the image sensor 332 (e.g., the image sensor 230) may be disposed at a position corresponding to the position of the UDC region 410.

In an embodiment, the sensor 340 may obtain information about a posture of the electronic device 101. For example, the sensor may include an inertial sensor (also referred to as a "motion sensor") (e.g., an acceleration sensor or a gyro sensor) for obtaining information about the posture of the electronic device 101. In an embodiment, the posture of the electronic device 101 may include a position of the electronic device 101 and/or a direction in which the electronic device faces. In an embodiment, the sensor 340 may further include various sensors (e.g., at least one sensor included in the sensor module 176 in FIG. 1) in addition to the inertial sensor.

In an embodiment, the memory 350 may be included in the memory 130 in FIG. 1.

In an embodiment, the memory 350 may store a variety of information for performing an operation of providing an image. The variety of information stored in the memory 350 to perform an operation of providing an image will be described later.

In an embodiment, the processor 360 may be included in the processor 120 in FIG. 1.

In an embodiment, the processor 360 may control overall operation of providing an image. In an embodiment, the processor 360 may include one or more processors for performing an operation of providing an image. An operation performed by the processor to provide an image will be described with reference to FIG. 6 and subsequent drawings.

In an embodiment, although FIG. 3 illustrates that the electronic device 101 includes the display 310, the driving part 320, the camera module 330, the sensor 340, the memory 350, and/or the processor 360, the disclosure is not limited thereto. For example, the electronic device 101 may further include at least one element (e.g., the communication module 190) among the elements of the electronic device 101 illustrated in FIG. 1.

An electronic device 101 according to various embodiments may include a display 310 including a first region being capable of reciprocating, a camera module 330 configured to obtain an image using incident light through the first region, a driving part 320 configured to reciprocate the first region, and at least one processor (e.g., the processor 360) electrically connected to the display 310, the camera module 330, and the driving part 320, wherein the at least one processor (e.g., the processor 360) may be configured to control the driving part 320 such that the first region reciprocates, obtain a plurality of first images through the camera module 330 while the first region reciprocates, and obtain a second image by synthesizing the plurality of first images.

In various embodiments, the at least one processor (e.g., the processor 360) may be configured to control the driving part 320 such that the first region vibrates in a vertical vibration form in which the first region vibrates in a direction perpendicular to a surface on which the display 310 is visually exposed to an outside and/or in a horizontal vibration form in which the first region vibrates in a direction parallel to the surface on which the display 310 is visually exposed to the outside.

In various embodiments, the vertical vibration form may include a first vertical vibration form in which the first region vibrates to be bent in a first direction perpendicular to a surface on which the display 310 is visually exposed to an outside, based on an edge of the first region, a second vertical vibration form in which the first region vibrates to be bent in the first direction, based on both ends of the first region, and/or a third vertical vibration form in which the first region linearly reciprocates in the first direction, and the horizontal vibration form may include a first horizontal vibration form in which the first region linearly reciprocates in a second direction parallel to the surface on which the display 310 is visually exposed to the outside and/or a second horizontal vibration form in which the first region linearly reciprocates in a third direction, which is different from the second direction and parallel to the surface on which the display 310 is visually exposed to the outside.

In various embodiments, the at least one processor (e.g., the processor 360) may be configured to control the driving part 320 such that the first region reciprocates in at least one of the vertical vibration form, the first horizontal vibration form, or the second horizontal vibration form.

In various embodiments, the at least one processor (e.g., the processor 360) may be configured to select a vibration form in which the first region is to vibrate from among the at least one vibration form, based on a user input, and control the driving part 320 such that the first region vibrates in the selected vibration form.

In various embodiments, the at least one processor (e.g., the processor 360) may be configured to determine a quality of the second image, determine a vibration form in which the first region is to vibrate from among the at least one vibration form, based on the quality of the second image, and control the driving part 320 such that the first region vibrates in the selected vibration form.

In various embodiments, the electronic device may further include a sensor 340, and the at least one processor (e.g., the processor 360) may be further configured to obtain information on a posture of the electronic device 101 through the sensor 340 while the plurality of first images is obtained, determine a quality of the second image, and determine a posture of the electronic device 101 to be guided to a user when obtaining an image, based on the quality of the second image.

In various embodiments, the at least one processor (e.g., the processor 360) may be further configured to configure a period for which the first region reciprocates and/or a period for which the camera module 330 obtains an image to obtain the plurality of first images in different states and/or positions of the first region for one period for which the first region reciprocates.

In various embodiments, the at least one processor (e.g., the processor 360) may be configured to control the driving part 320 such that the first region reciprocates for a period less than the period for which the camera module 330 obtains an image.

In various embodiments, the display 310 may include the first region and a second region other than the first region in the display 310, wherein the pixels per inch (PPI) of the first region may be less than the PPI of the second region.

In various embodiments, the at least one processor (e.g., the processor 360) may be configured to control a period for which the first region reciprocates, based on an exposure time of the camera module 330, ambient illuminance, and/or a mode in which the camera module 330 obtains an image.

In various embodiments, the at least one processor (e.g., the processor 360) may be configured to control reciprocating movement of the first region, based on whether or not a light source exists within an angle of view of the camera module 330.

An electronic device 101 according to various embodiments may include a display (e.g., the display 310) including a first region being capable of reciprocating (e.g., the UDC region 410) and a second region (e.g., the non-UDC region 420) having a lower pixels per inch (PPI) than a PPI of the first region, a camera module 330 disposed under the first region and configured to obtain an image using incident light passing through the first region, a wire configured to connect the first region and the second region, a driving part 320 configured to reciprocate the first region, an elastic member 326 configured to allow the first region to move, and a support member 327 to which the elastic member 326 and/or the driving part 320 are attached.

In various embodiments, the elastic member 326 may be disposed under the driving part 320 or disposed on the same surface as the driving part 320.

Figure 6:
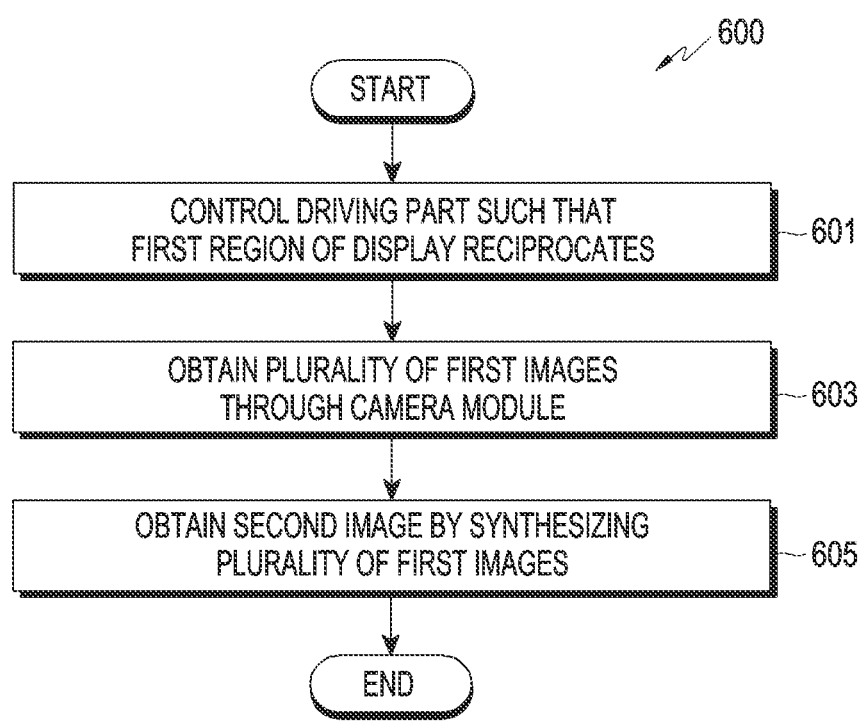
FIG. 6 is a flowchart illustrating a method of providing an image according to an embodiment of the disclosure.

FIG. 6 is a flowchart illustrating a method of providing an image according to an embodiment of the disclosure.

Referring to FIG. 6 depicting flowchart 600, in operation 601, in an embodiment, the processor 360 may control the driving part 320 such that a first region (hereinafter will be interchangeably used with a "UDC region 410") of the display 310 reciprocates (hereinafter, will be interchangeably used with "vibrates").

In an embodiment, processor 360 may control the driving part 320 such that the UDC region 410 of the display 310 vibrates based on a user input for obtaining an image (e.g., a second image in operation 605 or a capture image) (e.g., a user input for capturing an image while displaying a preview). For example, if a camera application is executed, the processor 360 may control the display 310 to turn off the UDC region 410. The processor 360 may obtain an image using light incident on the camera module 330 through the UDC region 410. The processor 360 may display the obtained image as a preview through the non-UDC region 420 of the display 310. The processor 360 may control the driving part 320 such that the UDC region 410 vibrates while the camera module 330 is obtaining images (e.g., a plurality of first images in operation 603) that are used to obtain (e.g., synthesize) an image (e.g., a captured image), based on a user input for obtaining an image while the obtained image is being displayed as a preview.

In an embodiment, the processor 360 may control the driving part 320 such that the UDC region 410 vibrates based on a user input for executing a camera application. For example, the processor 360 may control the display 310 to turn off the UDC region 410 in response to the user input for executing the camera application. The processor 360 may control the driving part 320 such that the UDC region 410 vibrates while the camera module 330 is obtaining images (e.g., a plurality of first images in operation 603) used to obtain (e.g., synthesize) an image (and a captured image) to be displayed as a preview.

In an embodiment, the processor 360 may control the driving part 320 such that the UDC region 410 of the display 310 vibrates in a specified vibration form. Hereinafter, an operation in which the processor 360 controls the driving part 320 such that the UDC region 410 of the display 310 vibrates in a specified vibration form will be described with reference to FIGS. 7A, 7B, 8, and 9.

Figure 7A:
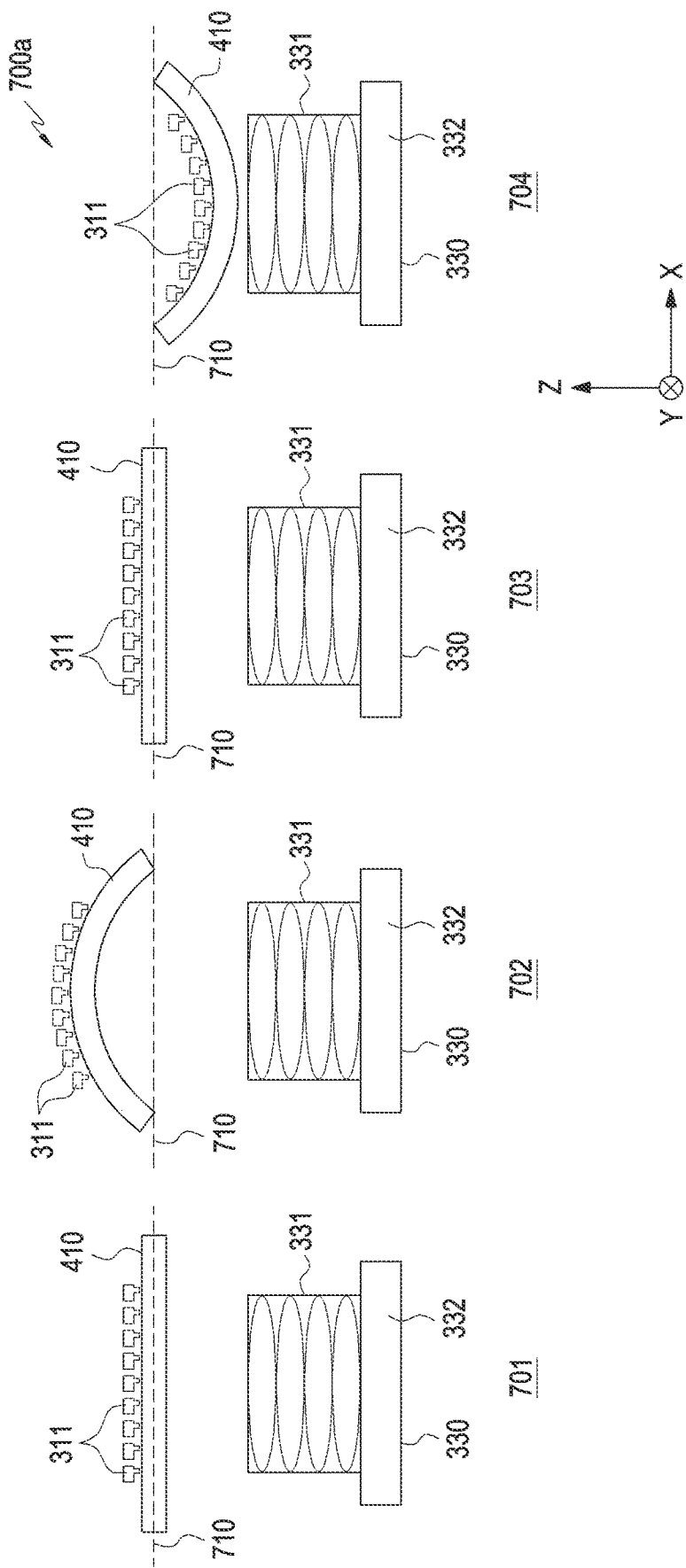
FIGS. 7A and 7B are diagrams illustrating a method of vibrating an under-display camera (UDC) region in a vertical vibration form according to various embodiments of the disclosure.
Figure 7B:
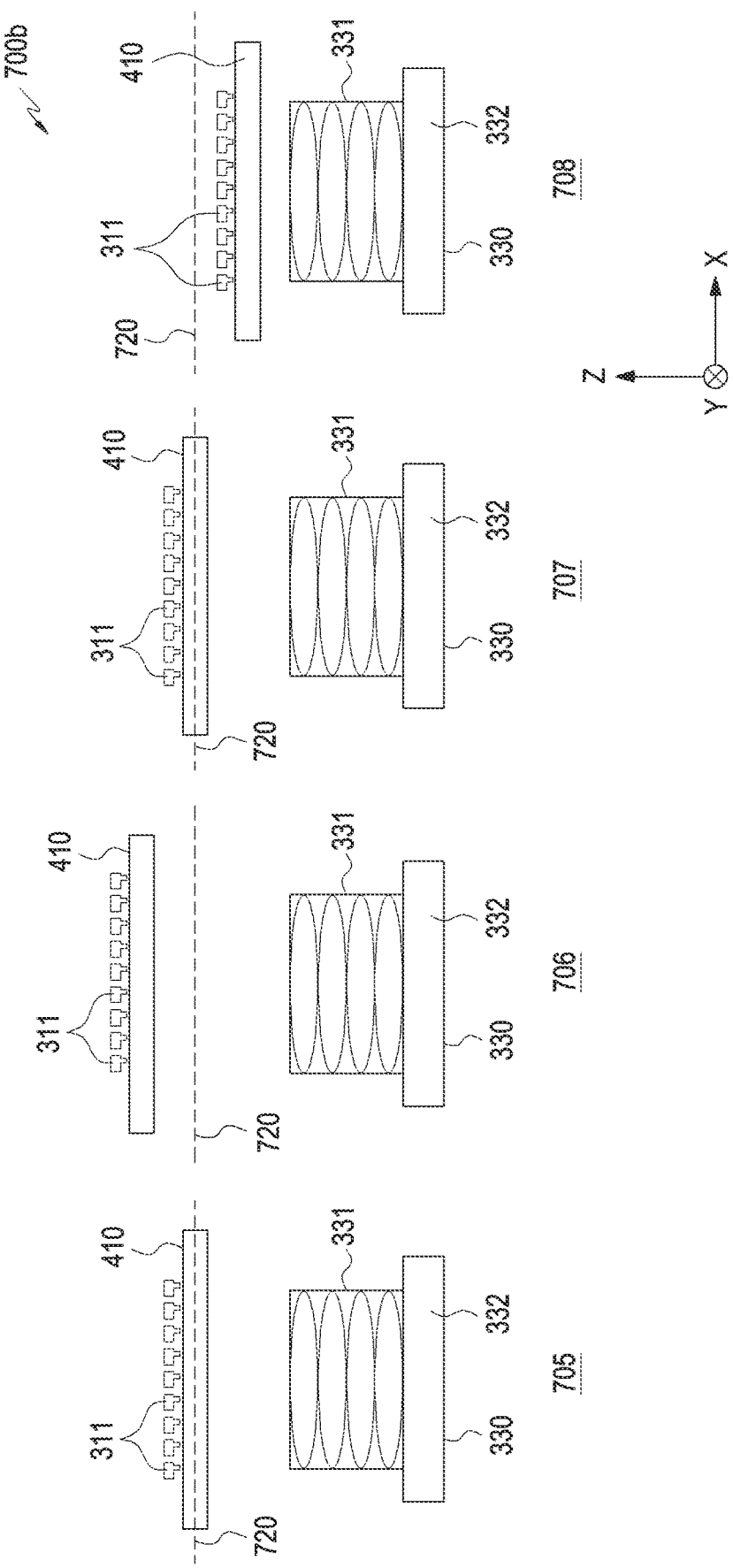

FIGS. 7A and 7B are diagrams illustrating a method of vibrating a UDC region in a vertical vibration form according to various embodiments of the disclosure.

Figure 8:
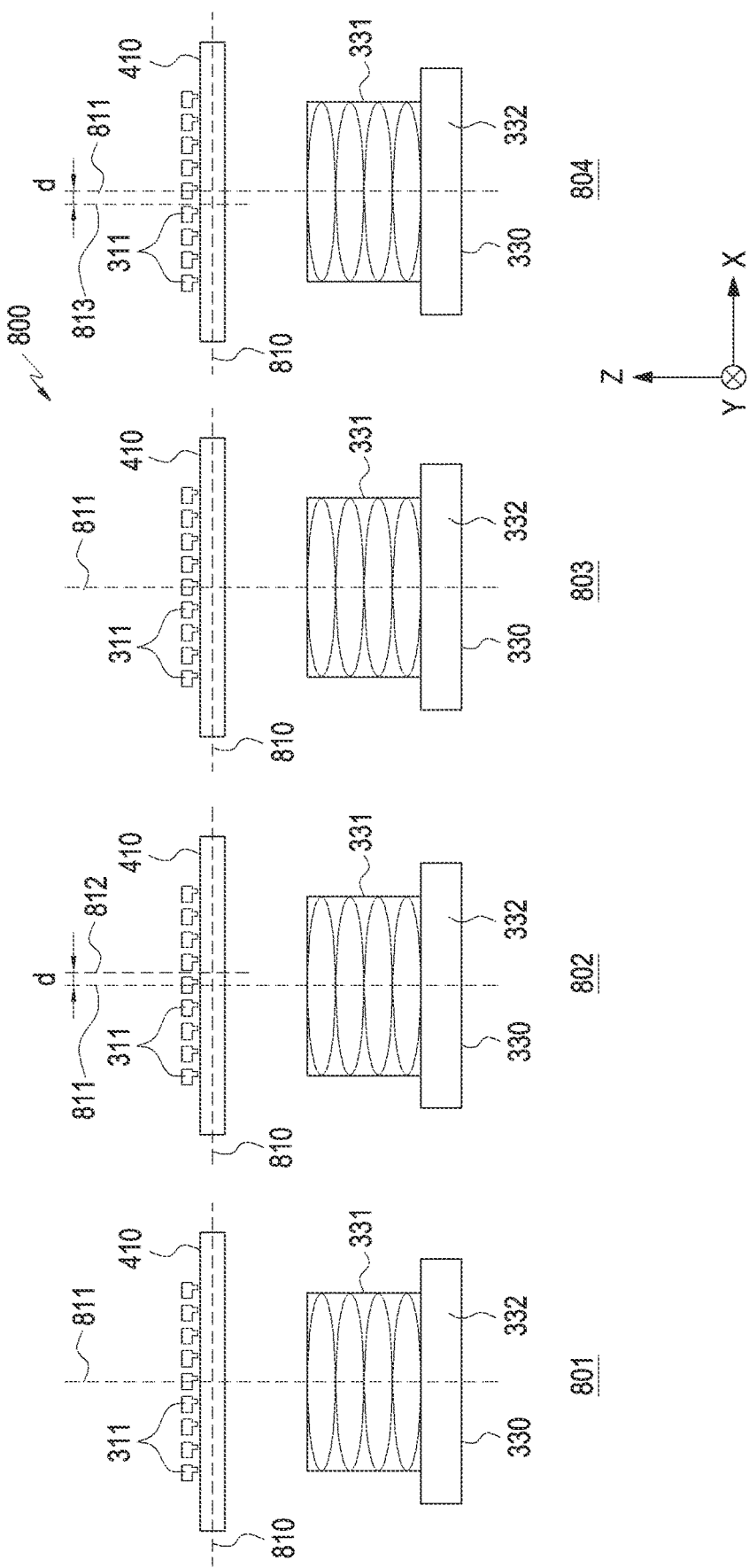
FIG. 8 is a diagram illustrating a method of vibrating a UDC region in a horizontal vibration form according to an embodiment of the disclosure.

FIG. 8 is a diagram illustrating a method of vibrating a UDC region in a horizontal vibration form according to an embodiment of the disclosure.

Figure 9:
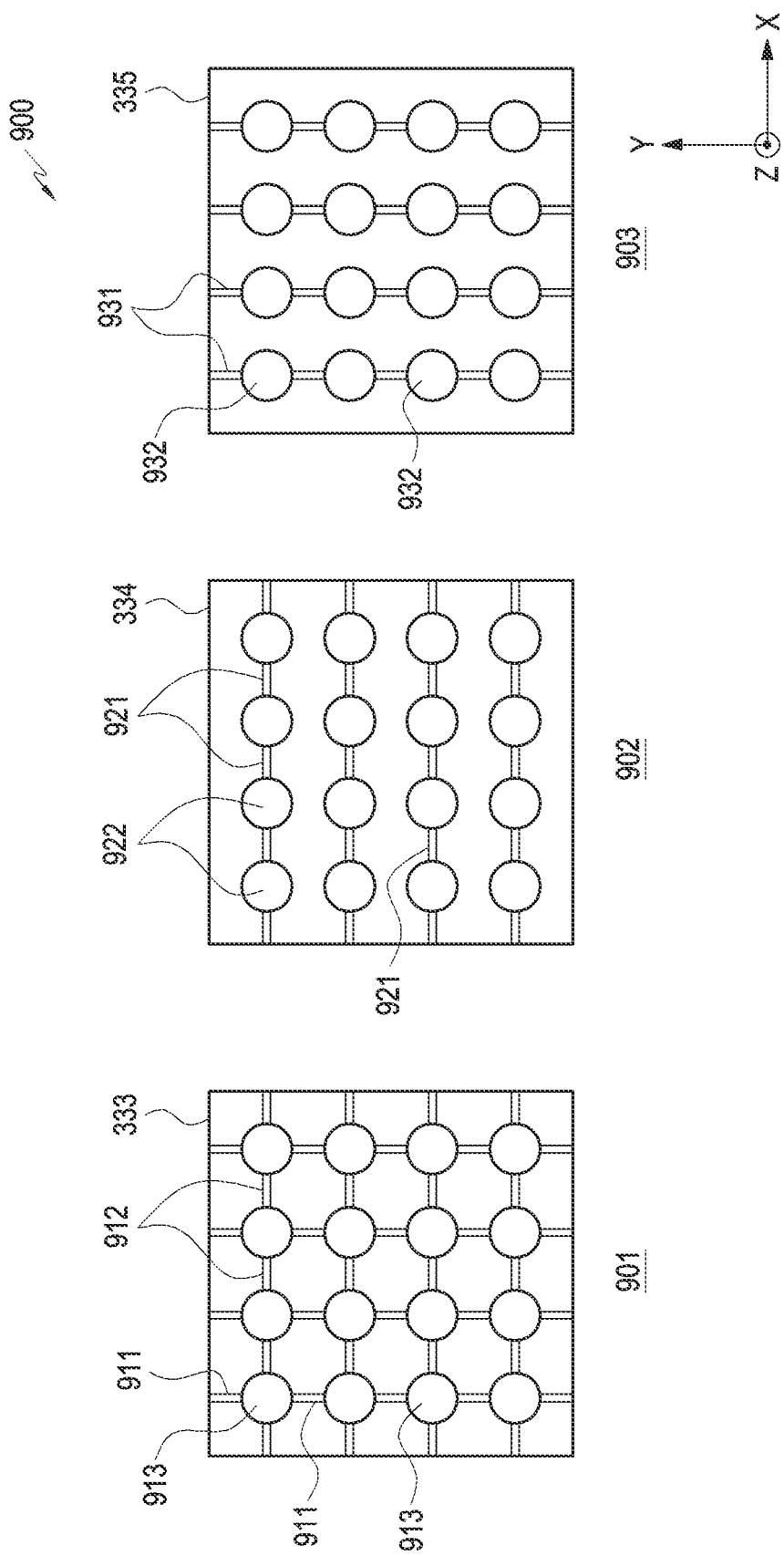
FIG. 9 is a diagram illustrating a method of vibrating a UDC region depending on a direction in which wires included in the UDC region are arranged according to an embodiment of the disclosure.

FIG. 9 is a diagram illustrating a method of vibrating a UDC region depending on a direction in which wires included in the UDC region are arranged according to an embodiment of the disclosure.

Referring to FIGS. 7A, 7B, 8, and 9 (depicting diagrams 700a, 700b, 800, and 900, respectively) in an embodiment, FIG. 7A may show an example in which the UDC region 410 vibrates in a first vertical vibration form and/or a second vertical vibration form. For example, FIG. 7A may show an example in which the UDC region 410 vibrates in the first vertical vibration form in which the UDC region 410 is bent alternately in the +Z-axis direction and the −Z-axis direction, based on the edge (border) of the UDC region 410 (e.g., the portion indicated by the dotted line 411 in FIG. 4) (or in the second vertical vibration form in which the UDC region 410 is bent alternately in the +Z-axis direction and the −Z-axis direction, based on the both ends (e.g., the points 412 and 413 or the points 414 and 415) of the UDC region 410).

In an embodiment, in reference numeral 701, the UDC region 410 may be in a first state (or at a first position) in which it is not bent. For example, in reference numeral 701, the UDC region 410 may be in the first state in which the entire UDC region 410 is positioned along a reference line 710 (e.g., a straight line connecting both ends of the UDC region 410 in the state in which the UDC region 410 is not bent or a line corresponding to the position of the UDC region 410 in the state in which the UDC region 410 is turned on) without being bent immediately before starting to vibrate. In reference numeral 702, the UDC region 410 may switch from the first state to a second state (or a second position) in which the UDC region 410 is bent in the +Z-axis direction. In reference numeral 703, the UDC region 410 may switch from the second state to a third state (or a third position) the same as the first state. In reference numeral 704, the UDC region 410 may switch from the third state to a fourth state (or a fourth position) in which the UDC region 410 is bent in the −Z-axis direction. Although not shown in FIG. 7A, the UDC region 410 may switch from the fourth state to the first state. In an embodiment, the processor 360 may control the driving part 320 to repeat an operation (e.g., one cycle of vibration) in which the UDC region 410 sequentially switches to the first state, the second state, the third state, and the fourth state over time.

In an embodiment, FIG. 7B may show an example in which the UDC region 410 vibrates in a third vertical vibration form. For example, FIG. 7B shows an example in which the UDC region 410 vibrates in the third vertical vibration form in which the UDC region 410 linearly moves alternately in the +Z-axis direction and the −Z-axis direction without being bent.

In an embodiment, in reference numeral 705, the UDC region 410 may be in a first state in which the entire UDC region 410 is positioned along a reference line 720 (e.g., a line corresponding to the position of the UDC region 410 in the state in which the UDC region 410 is turned on) immediately before starting to vibrate. In reference numeral 706, the UDC region 410 may switch from the first state to a second state (or a second position) in which the entire UDC region 410 is linearly moved in the +Z-axis direction. In reference numeral 707, the UDC region 410 may switch from the second state to a third state (or a third position) the same as the first state. In reference numeral 708, the UDC region 410 may switch from the third state to a fourth state (or a fourth position) in which the entire UDC region 410 is linearly moved in the −Z-axis direction. Although not shown in FIG. 7B, the UDC region 410 may switch from the fourth state to the first state. In an embodiment, the processor 360 may control the driving part 320 to repeat an operation (e.g., one cycle of vibration) in which the UDC region 410 sequentially switches to the first state, the second state, the third state, and the fourth state over time.

In an embodiment, FIG. 8 may show an example in which the UDC region 410 vibrates in a first horizontal vibration form or a second horizontal vibration form. For example, FIG. 8 may show an example in which the UDC region 410 vibrates in the first horizontal vibration form in which the UDC region 410 linearly moves alternately in the +X-axis direction and the −X-axis direction (or in the second horizontal vibration form in which the UDC region 410 linearly moves alternately in the +Y-axis direction and the −Y-axis direction) without bending the UDC region 410.

In an embodiment, in reference numeral 801, the UDC region 410 may be in a first state in which the entire UDC region 410 is positioned along a reference line 810 (e.g., a line corresponding to the position of the UDC region 410 in the state in which the UDC region 410 is turned on) and in which the center of the UDC region 410 is on a line 811 that is perpendicular to the surface of the display 310 and passes through the center of a lens immediately before starting the vibration. In reference numeral 802, the UDC region 410 may switch from the first state to a second state (or a second position) in which the UDC region 410 is linearly moved in the +X-axis direction (e.g., the second state in which the UDC region 410 is shifted from the first state in the +X-axis direction by a distance d between the line 812 and the line 811, which are perpendicular to the surface of the display 310 and pass through the center of the UDC region 410). In reference numeral 803, the UDC region 410 may switch from the second state to a third state (or a third position) the same as the first state. In reference numeral 804, the UDC region 410 may switch from the third state to a fourth state (or a fourth position) in which the UDC region 410 is linearly moved in the −X-axis direction (e.g., the fourth state in which the UDC region 410 is shifted from the third state in the −X-axis direction by a distance d between the line 813 and the line 811, which are perpendicular to the surface of the display 310 and pass through the center of the UDC region 410). Although not shown in FIG. 8, the UDC region 410 may switch from the fourth state to the first state. In an embodiment, the processor 360 may control the driving part 320 to repeat an operation (e.g., one cycle of vibration) in which the UDC region 410 sequentially switches to the first state, the second state, the third state, and the fourth state over time.

However, the form of vibrating the UDC region 410 is not limited to the above-described examples. For example, the processor 360 may control the driving part 320 such that the UDC region 410 vibrates to be bent alternately in the +Z-axis direction and the −Z-axis direction, based on points that are on the dotted line 411 and have a connecting line therebetween parallel to the diagonal direction of the X-axis and Y-axis, instead of the points 412 and 413 having a connecting line therebetween parallel to the X-axis or the points 414 and 415 having a connecting line therebetween parallel to the Y-axis, in the second vertical vibration form. As another example, the processor 360 may control the driving part 320 such that the UDC region 410 vibrates to linearly move alternately in the diagonal direction of the X-axis and Y-axis, which is parallel to the surface on which the display 310 is visually exposed to the outside.

In an embodiment, the processor 360 may control the driving part 320 such that the UDC region 410 vibrates in a combination form of the vertical vibration forms (e.g., the first vertical vibration, the second vertical vibration form, or the third vertical form), the first horizontal vibration form, and the second horizontal vibration form. For example, the processor 360 may control the driving part 320 such that the UDC region 410 vibrates in the first horizontal vibration form for a first time and such that the UDC region 410 vibrates in the second horizontal vibration form for a second time subsequent to the first time.

In an embodiment, the processor 360 may control the driving part 320 such that the UDC region 410 vibrates in a vibration form selected based on a user input or a vibration form selected based on learning. A method for the processor 360 to control the driving part 320 such that the UDC region 410 vibrates in a vibration form selected based on a user input or a vibration form selected based on learning will be described later with reference to FIG. 12.

In an embodiment, the processor 360 may control the driving part 320 such that the direction in which the UDC region 410 vibrates varies depending on the directions of the wires (e.g., the wires connecting a plurality of pixels 311 of the light-emitting unit included in the UDC region 410 and/or the wires connecting the light-emitting unit included in the UDC region 410 and the elements included in the non-UDC region 420).

In an embodiment, as shown by reference numeral 901, in the case where the UDC region 410 is implemented such that wires 911 and 912 included in the UDC region 333 (e.g., wires connecting a plurality of pixels 913) are arranged in a lattice in a first direction (e.g., the X-axis direction) and a second direction (e.g., the Y-axis direction), the processor 360 may be implemented such that the UDC region 410 vibrates to be bent alternately in the +Z-axis direction and the −Z-axis direction (the first vertical vibration form), based on the edge of the UDC region 410 (e.g., the portion indicated by the dotted line 411 in FIG. 4). In an embodiment, as shown by reference numeral 901, in the case where the UDC region 410 is implemented such that the wires 911 and 912 included in the UDC region 333 (e.g., wires connecting a plurality of pixels 913) are arranged in a lattice in the first direction (e.g., the X-axis direction) and the second direction (e.g., the Y-axis direction), the processor 360 may control the driving part 320 such that the UDC region 410 vibrates in the first horizontal vibration form for a first time and such that the UDC region 410 vibrates in the second horizontal vibration form for a second time subsequent to the first time.

In an embodiment, as shown by reference numeral 902, in the case where the UDC region 410 is be implemented such that the wires included in the UDC region 334 (e.g., wires connecting a plurality of pixels 922) are arranged in a first direction (e.g., the X-axis direction), the processor 360 may control the driving part 320 such that the UDC region 410 vibrates in the Y-axis direction (e.g., the +Y-axis direction and the −Y-axis direction) perpendicular to the first direction (such that the UDC region 410 vibrates in the second horizontal vibration form). In an embodiment, as shown by reference numeral 902, in the case where the UDC region 410 is implemented such that the wires 921 included in the UDC region 334 are arranged in the first direction (e.g., the X-axis direction), the processor 360 may control the driving part 320 such that the UDC region 410 vibrates to be bent alternately in the +Z-axis direction and the −Z-axis direction, based on the points 414 and 415 having a connecting line therebetween perpendicular to the Y-axis direction.

In an embodiment, as shown by reference numeral 903, in the case where the UDC region 410 is implemented such that the wires included in the UDC region 335 (e.g., wires 931 connecting a plurality of pixels 932) are arranged in a second direction (e.g., the Y-axis direction), the processor 360 may control the driving part 320 such that the UDC region 410 vibrates in the first direction (e.g., the X-axis direction) perpendicular to the second direction (such that the UDC region 410 vibrates in the first horizontal vibration form). In an embodiment, as shown by reference numeral 903, in the case where the UDC region 410 is implemented such that the wires included in the UDC region 335 are arranged in the second direction (e.g., the Y-axis direction), the processor 360 may control the driving part 320 such that the UDC region 410 vibrates to be bent alternately in the +Z-axis direction and the −Z-axis direction, based on the points 412 and 413 of the UDC region 410 having a connecting line therebetween perpendicular to the X-axis direction.

However, the form in which the driving part 320 vibrates the UDC region 410 depending on the direction of a wire included in the UDC region 410 is not limited to the above-described examples.

In an embodiment, the driving part 320 may be implemented such that the UDC region 410 vibrates for a vibration time (e.g., a vibration period and/or the total time of vibration) and/or at a vibration magnitude (e.g., a vibration amplitude) under the control of the processor 360.

In an embodiment, the processor 360 may control (e.g., adjust) the vibration period of the UDC region 410, based on an exposure time of the camera module 330 (e.g., the image sensor 230) and/or ambient illuminance. For example, the processor 360 may configure the exposure time of the camera module 330 to be shorter as the ambient illuminance increases (e.g., a condition in which a large amount of light enters the electronic device 101) and configure the exposure time of the camera module 330 to be longer as the ambient illuminance decreases (e.g., an environment in which a small amount of light enters the electronic device 101). The processor 360 may increase the vibration period of the UDC region 410 as the exposure time of the camera module 330 increases (or as the ambient illuminance decreases) and reduce the vibration period of the UDC region 410 as the exposure time of the camera module 330 decreases (or as the ambient illuminance increases). In an embodiment, the processor 360 may reduce the vibration period of the UDC region 410 as the ambient illuminance increases, thereby effectively dispersing noise generated by light diffraction.

In an embodiment, the processor 360 may control (e.g., configure) the vibration period of the UDC region 410, based on the mode in which the camera module 330 obtains an image. For example, if the mode in which the camera module 330 obtains an image is a mode for obtaining a preview, the processor 360 may configure the vibration period of the UDC region 410 as a first vibration period. If the mode in which the camera module 330 obtains an image is a mode for obtaining a capture image, the processor 360 may configure the vibration period of the UDC region 410 as a second vibration period shorter than the first vibration period.

In an embodiment, the processor 360 may control the vibration of the UDC region 410, based on whether or not a light source exists within an angle of view of the camera module 330. For example, the processor 360 may detect a saturated region from the image obtained through the camera module 330. If the area of the saturated region is equal to or greater than a specified area or corresponds to a specified shape, the processor 360 may determine that a light source exists within the angle of view of the camera module 330. If it is determined that the light source exists within the angle of view of the camera module 330, the processor may control the driving part 320 to vibrate the UDC region 410. If it is determined that the light source does not exist within the angle of view of the camera module 330, the processor may perform control so as not to vibrate the UDC region 410.

In operation 603, in an embodiment, the processor 360 may obtain a plurality of first images through the camera module 330 while the first region (UDC region 410) of the display 310 is reciprocating (e.g., vibrating).

In an embodiment, the processor 360 may obtain a plurality of first images through the camera module 330 in different states and/or positions of the UDC region 410 while the UDC region 410 is vibrating. For example, in FIG. 7A, the processor 360 may obtain a plurality of first images through the camera module 330 in each of the first state, the second state, the third state, and the fourth state of the UDC region 410 denoted by reference numeral 701. As another example, in FIG. 7A, the processor 360 obtains a plurality of first images through the camera module 330 in each of the second state and the fourth state of the UDC region 410 denoted by reference numeral 701.

In an embodiment, in order to obtain a plurality of first images through the camera module 330 in different states and/or positions of the UDC region 410 for one period of vibration of the UDC region 410, the processor 360 may configure (e.g., adjust) a vibration period of the UDC region 410 and/or an image acquisition period of the camera module 330. For example, the processor 360 may configure the vibration period of the UDC region 410 and/or the image acquisition period of the camera module 330 such that the period for which the UDC region 410 vibrates is approximately double the period for which the camera module 330 obtains an image in order to obtain a plurality of first images through the camera module 330 in each of the second state and the fourth state of the UDC region 410 in FIG. 7A. As another example, the processor 360 may configure the vibration period of the UDC region 410 and/or the image acquisition period of the camera module 330 such that the period for which the UDC region 410 vibrates is approximately four times the period for which the camera module 330 obtains an image in order to obtain a plurality of first images through the camera module 330 in each of the first state, the second state, the third state, and the fourth state of the UDC region 410 in FIG. 7A.

However, the method in which the processor 360 configures the vibration period of the UDC region 410 and/or the image acquisition period of the camera module 330 is not limited to the above-described example.

In an embodiment, the processor 360 may obtain a plurality of first images through the camera module 330 while the UDC region 410 is vibrating, based on information obtained from the sensor 340. For example, the processor 360 may obtain information on the movement of the electronic device 101 through the inertial sensor. In an embodiment, the processor 360 may determine whether or not the movement of the electronic device 101 is caused by vibration of the UDC region 410 for obtaining an image, based on information on the movement of the electronic device 101. For example, based on the information on the movement of the electronic device 101, the processor 360 may determine whether the movement of the electronic device 101 is caused by vibration of the UDC region 410 for obtaining an image or whether the movement of the electronic device 101 is caused by a cause other than the vibration of the UDC region 410 for obtaining an image (e.g., caused by the user carrying the electronic device 101). In an embodiment, if it is determined that the movement of the electronic device 101 is caused by vibration of the UDC region 410 for obtaining an image, the processor 360 may perform an operation of obtaining a plurality of first images through the camera module 330. If it is determined that the movement of the electronic device 101 is caused by a cause other than the vibration of the UDC region 410 for obtaining an image, the processor 360 may not perform an operation of obtaining a plurality of first images through the camera module 330. However, the disclosure is not limited thereto. For example, in the case where the processor 360 transmits a control signal to the driving part 320 such that the UDC region 410 vibrates, based on a user input for obtaining an image, the processor 360 may perform an operation of obtaining a plurality of first images through the camera module 330 while the UDC region 410 is vibrating without obtaining information on the movement of the electronic device 101 from the sensor 340.

In operation 605, in an embodiment, the processor 360 may obtain a second image by synthesizing a plurality of first images.

In an embodiment, the processor 360 may obtain a second image (e.g., a composite image) by applying a temporal noise reduction (TNR) technique to the plurality of first images. For example, the processor 360 may accumulate and add a plurality of first images obtained while the UDC region 410 is vibrating, thereby obtaining a second image having minimized artifacts (e.g., a portion of the image affected by the light that passes through the UDC region 410, enters the camera module 330, and is diffracted by the wires included in the UDC region 410 appears, or light splitting, light spreading, and/or flare appearing in the image) (also referred to as "noise component"). Hereinafter, a method in which the processor 360 obtains a second image by synthesizing a plurality of first images will be described with reference to FIGS. 10 and 11.

Figure 10:
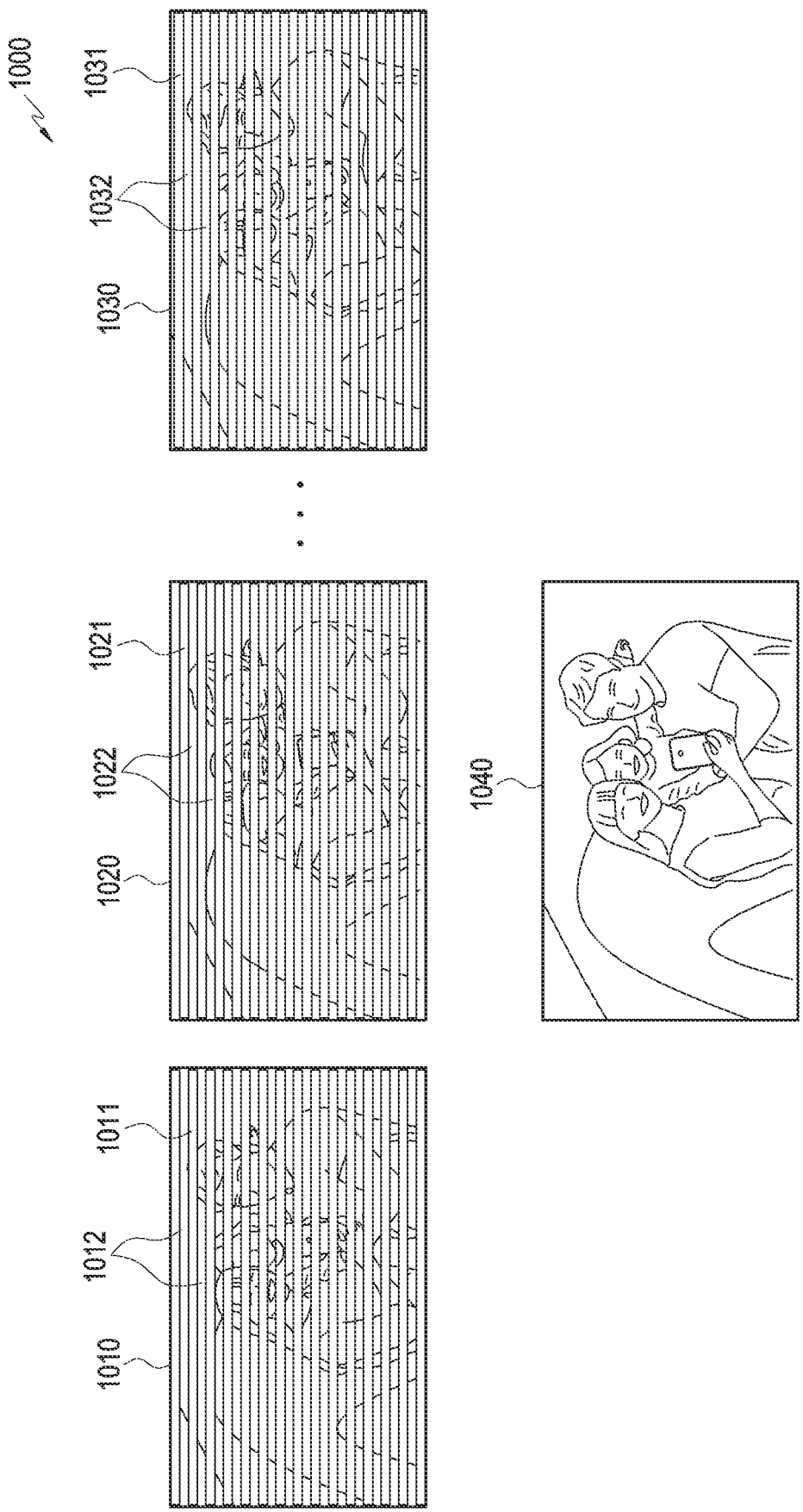
FIGS. 10 and 11 are diagrams illustrating a method of obtaining a second image by synthesizing a plurality of images according to various embodiments of the disclosure.
Figure 11:
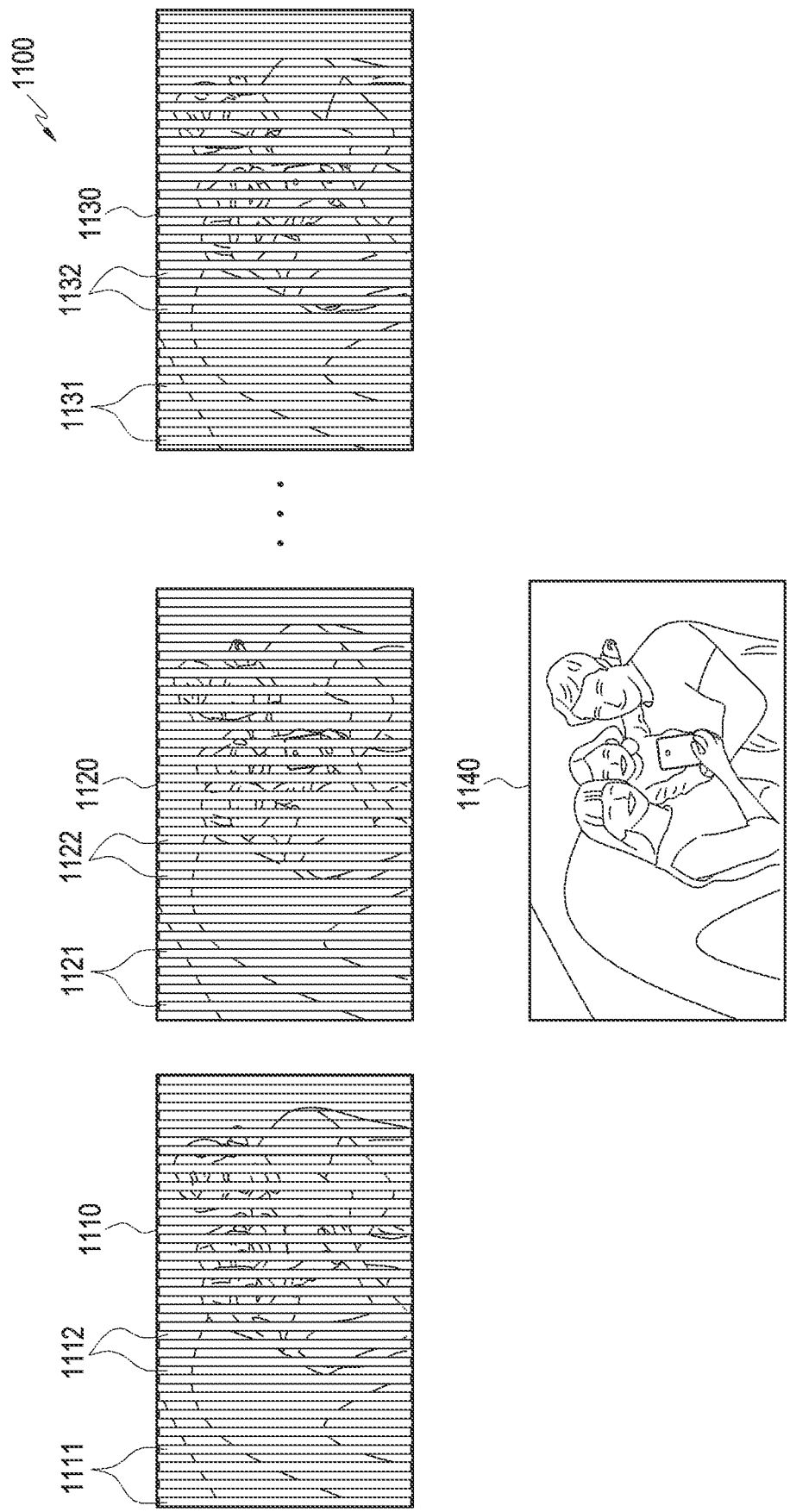

FIGS. 10 and 11 are diagrams illustrating a method of obtaining a second image by synthesizing a plurality of images according to various embodiments of the disclosure.

Referring to FIGS. 10 and 11 depicting diagrams 1000 and 1100, respectively, in an embodiment, FIG. 10 may show an example of obtaining a second image by synthesizing a plurality of first images obtained while a UDC region 410 is vibrating in a second vertical vibration form in which the UDC region 410 is alternately bent in the +Z-axis direction and the −Z-axis direction, based on both ends of the UDC region 410 (points 414 and 415 in FIG. 4). For example, in the case where the UDC region 410 vibrates in the second vertical vibration form, based on the both ends of the UDC region 410 (the points 414 and 415 in FIG. 4), the size (e.g., the length) of an interval (e.g., an arrangement interval) between a plurality of pixels 311 included in the UDC region 410 may vary (e.g., increase) in a direction parallel to the line connecting the both ends of the UDC region 410 (the points 414 and 415 in FIG. 4), based on the surface on which the display 310 is visually exposed to the outside (e.g., when the display 310 is viewed in the −Z-axis direction). Vertical artifacts 1011, 1021, and 1031 may occur in each of image 1 (1010), image 2 (1020), and image 3 (1030) sequentially obtained through the camera module 330 while the UDC region 410 is vibrating in the second vertical vibration form by the wires included in the UDC region 410 (e.g., because the light incident on the UDC region 410 is diffracted by the wires included in the UDC region 410). The processor 360 may synthesize image 1 (1010), image 2 (1020), and image 3 (1030), thereby obtaining an image 1040, as a second image, in which the artifacts 1011, 1021, and 1031 are offset (or minimized or removed) and in which signal components 1012, 1022, and 1032 are enhanced.

In an embodiment, FIG. 11 may show an example of obtaining a second image by synthesizing a plurality of first images obtained while the UDC region 410 is vibrating in a first horizontal vibration form in which the UDC region 410 linearly moves alternately in the +X-axis direction and the −X-axis direction. For example, the positions of the plurality of pixels 311 included in the UDC region 410 may vary while the UDC region 410 is vibrating in the X-axis direction. Horizontal artifacts 1111, 1121, and 1131 may occur in each of image 1 (1110), image 2 (1120), and image 3 (1130) sequentially obtained through the camera module 330 while the UDC region 410 is vibrating in the X-axis direction by the wires included in the UDC region 410 (e.g., because the light incident on the UDC region 410 is diffracted by the wires included in the UDC region 410). The processor 360 may synthesize image 1 (1110), image 2 (1120), and image 3 (1130), thereby obtaining an image 1140, as a second image, in which the artifacts 1111, 1121, and 1131 are offset (or minimized or removed) and in which signal components 1112, 1122, and 1132 are enhanced.

Although not shown in FIG. 6, in an embodiment, if the second image is obtained, the processor may display the second image on the display 310 (e.g., the non-UDC region 420, or the non-UDC region 420 and the UDC region 410). In an embodiment, the processor may store the obtained second image in the memory 250.

Figure 12:
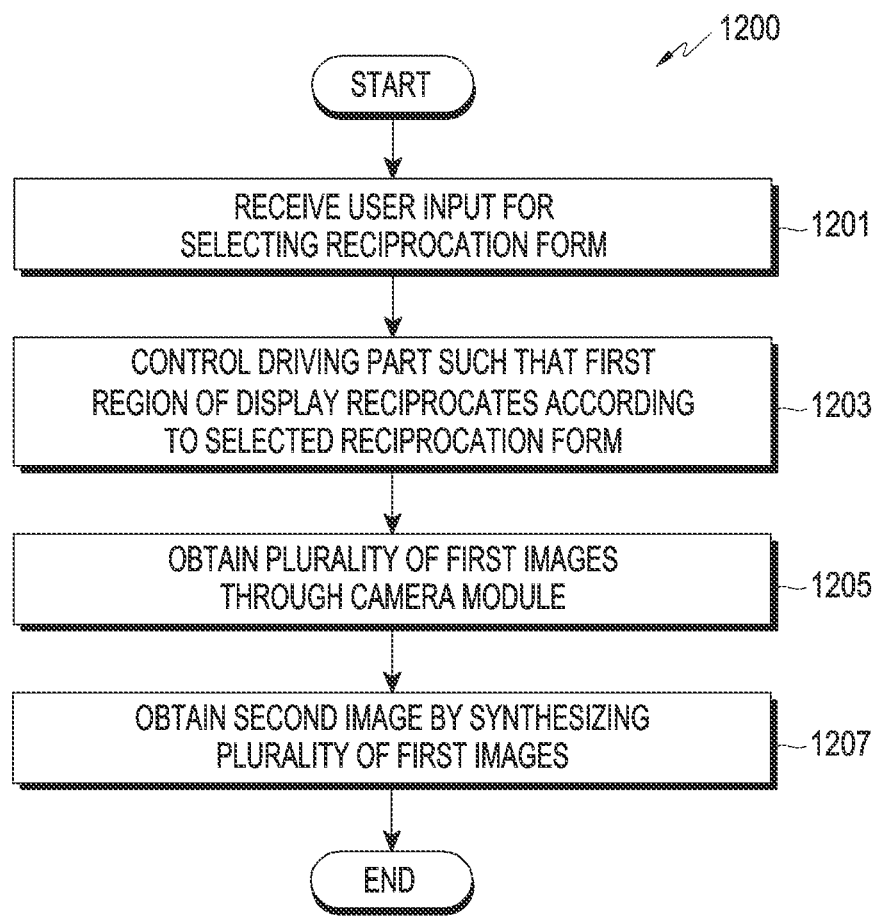
FIG. 12 is a flowchart illustrating a method of providing an image according to an embodiment of the disclosure.

FIG. 12 is a flowchart illustrating a method of providing an image according to an embodiment of the disclosure.

Referring to FIG. 12 depicting flowchart 1200, in operation 1201, in an embodiment, the processor 360 may receive a user input for selecting a reciprocation form (vibration form) of the UDC region 410.

In an embodiment, the processor 360 may control the driving part 320 such that the UDC region 410 vibrates in at least one of the vertical vibration form (e.g., the first vertical vibration form, the second vertical vibration form, or the third vertical vibration form), the first horizontal vibration form, or the second horizontal vibration form. For example, the processor 360 may control the driving part 320 such that the UDC region 410 vibrates in the first vertical vibration form. As another example, the processor 360 may control the driving part 320 such that the UDC region 410 vibrates in the first horizontal vibration form for a first time and such that the UDC region 410 vibrates in the second horizontal vibration form for a second time subsequent to the first time.

In an embodiment, the processor 360 may display a screen for selecting a vibration form of the UDC region 410 on the display 310. For example, the processor 360 may display, on the display 310, images indicating at least two or more vibration forms among the vertical vibration form (e.g., the first vertical vibration form, the second vertical vibration form, or the third vertical vibration form), the first horizontal vibration form, or the second horizontal vibration form (e.g., icons respectively corresponding to the at least two or more vibration forms) (or text) while a preview is being displayed on the display 310.

In an embodiment, the processor 360 may select a vibration form of the UDC region 410, based on a user input to the screen for selecting a vibration form. For example, the processor 360 may select a vibration form of the UDC region 410, based on a user input for selecting one vibration form from the images indicating at least two or more vibration forms among the vertical vibration form (e.g., the first vertical vibration form, the second vertical vibration form, or the third vertical vibration form), the first horizontal vibration form, or the second horizontal vibration form (e.g., icons respectively corresponding to the at least two or more vibration forms) (or text).

In operation 1203, in an embodiment, the processor 360 may control the driving part 320 such that a first region (UDC region 410) of the display 310 reciprocates (vibrates) according to the selected reciprocation form (selected vibration form). For example, if one vibration form is selected from among at least two or more vibration forms as a form in which the UDC region 410 can vibrate in operation 1201, the processor 360 may control the driving part 320 such that the UDC region 410 vibrates according to the selected vibration form.

Operation 1203 in which the processor 360 controls the driving part 320 to vibrate the UDC region 410 is at least partially the same as or similar to operation 601 in FIG. 6 in which the processor 360 controls the driving part 320 to vibrate the UDC region 410, so a detailed description thereof will be omitted.

In operation 1205, the processor 360 may obtain a plurality of first images through the camera module 330 while the first region (UDC region 410) of the display 310 is reciprocating (e.g., vibrating).

Since operation 1205 is at least partially the same as or similar to operation 603 in FIG. 6, a detailed description thereof will be omitted.

In operation 1207, in an embodiment, the processor 360 may obtain a second image by synthesizing the plurality of first images.

Since operation 1207 is at least partially the same as or similar to operation 605 in FIG. 6, a detailed description thereof will be omitted.

Although it has been described in FIG. 12 that the processor 360 controls the driving part 320 such that the UDC region 410 vibrates according to the vibration form selected based on a user input, the disclosure is not limited thereto.

In an embodiment, the processor 360 may provide a vibration form of the UDC region 410, based on learning using a plurality of second images obtained while the UDC region 410 is vibrating according to various vibration forms.

In an embodiment, the processor 360 may store a plurality of second images obtained while the UDC region 410 is vibrating according to various vibration forms and vibration forms of the UDC region 410 corresponding to the plurality of second images in the memory 350. For example, the processor 360 may associate image 1 obtained while the UDC region 410 is vibrating according to a first vertical vibration form with the first vertical vibration form, as the vibration form of the UDC region 410 at the time at which image 1 is obtained, and store the same in the memory 350. As another example, the processor 360 may associate image 2 obtained while the UDC region 410 is vibrating according to a first horizontal vibration form with the first horizontal vibration form, as the vibration form of the UDC region 410 at the time at which image 2 is obtained, and store the same in the memory 350.

In an embodiment, the processor 360 may determine a vibration form of the UDC region 410, based on the quality of each of the plurality of second images, and control the driving part 320 such that the UDC region 410 vibrates in the determined vibration form. For example, the processor 360 may determine (e.g., calculate) contrast of each of the plurality of second images. The processor 360 may determine a second image having the highest contrast from among the plurality of second images. If an input for obtaining an image is received after determining the second image, the processor 360 may control the driving part 320 such that the UDC region 410 vibrates in a vibration form of the UDC region 410 corresponding to the determined second image. However, a method of determining the quality of each of the plurality of second images is not limited to the method of comparing contrast between the plurality of second images. As another example, the processor 360 may identify a user input corresponding to each of the plurality of second images (e.g., an input for transmitting the second image to the external electronic device 101 or an input for deleting the second image stored in the memory 350). The processor 360 may give a high priority to the second image corresponding to the input for transmission to the external electronic device (e.g., the electronic device 102, the electronic device 104, and/or the server 108) (or increase the score set in the second image), and give a lower priority to the second image corresponding to the input for deleting the second image stored in the memory 350 (or reduce the score set in the second image). The processor 360 may determine the second image having the highest rank (or highest score) from the plurality of second images. If an input for obtaining an image is received after determining the second image, the processor 360 may control the driving part 320 such that the UDC region 410 vibrates in the vibration form of the UDC region 410 corresponding to the determined second image. However, a user input used to determine the quality of each of the plurality of second images is limited to the input for transmitting the second image to the external electronic device 101 and the input for deleting the second image stored in the memory 350.

Figure 13:
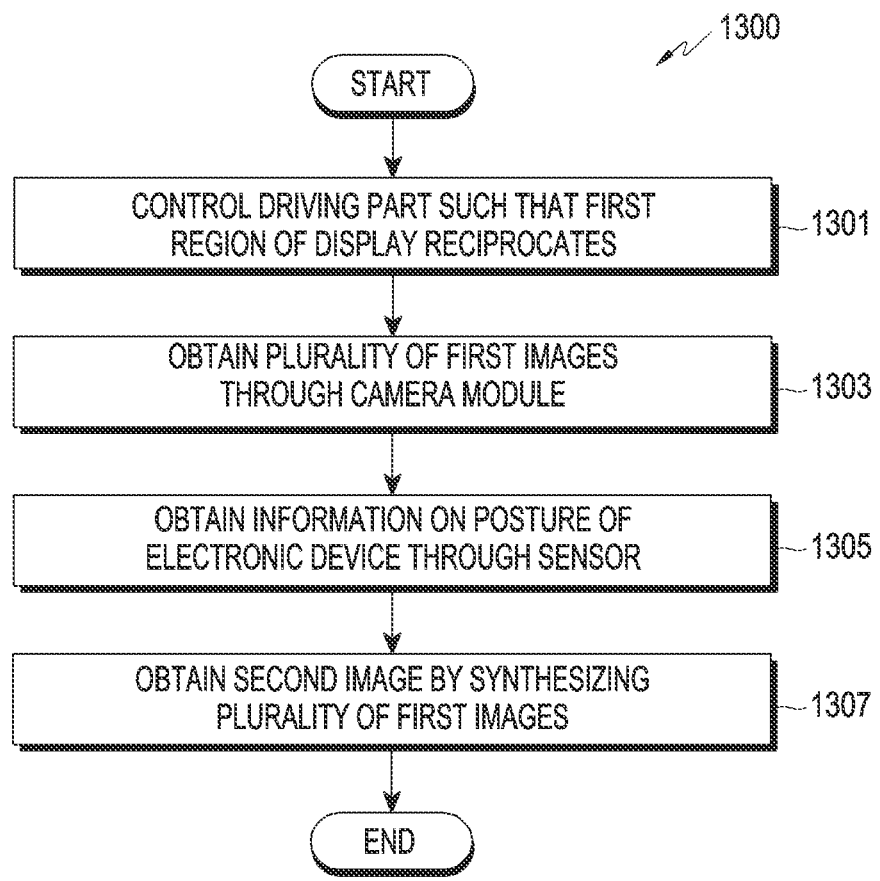
FIG. 13 is a flowchart illustrating a method of providing an image according to an embodiment of the disclosure.

FIG. 13 is a flowchart illustrating a method of providing an image according to an embodiment of the disclosure.

Referring to FIG. 13 depicting flowchart 1300, in operation 1301, in an embodiment, the processor 360 may control the driving part 320 such that a first region (UDC region 410) of the display 310 reciprocates (e.g., vibrates).

Since operation 1301 is at least partially the same as or similar to operation 601 in FIG. 6, a detailed description thereof will be omitted.

In operation 1303, in an embodiment, the processor 360 may obtain a plurality of first images through the camera module 330 while the first region (UDC region 410) of the display 310 is reciprocating (e.g., vibrating).

Since operation 1303 is at least partially the same as or similar to operation 603 in FIG. 6, a detailed description thereof will be omitted.

In operation 1305, in an embodiment, the processor 360 may obtain information on the posture of the electronic device 101 through the sensor 340 while obtaining the plurality of first images through the camera module 330. For example, the processor 360 may obtain information on the posture of the electronic device 101 (e.g., the position of the electronic device 101 and/or a direction in which the electronic device 101 faces) through the inertial sensor while obtaining the plurality of first images through the camera module 330.

In operation 1307, in an embodiment, the processor 360 may obtain a second image by synthesizing the plurality of first images.

Since operation 1307 is at least partially the same as or similar to operation 605 in FIG. 6, a detailed description thereof will be omitted.

Although not shown in FIG. 13, in an embodiment, the processor 360 may associate the information on the posture of the electronic device 101 obtained in operation 1305 with the second image and store the same in the memory 350.

In an embodiment, the processor 360 may provide a posture of the electronic device 101 for obtaining an image, based on the quality of each of the plurality of obtained second images (e.g., a plurality of second images obtained for a specified time). For example, the processor 360 may determine (e.g., calculate) contrast of each of the plurality of obtained second images. The processor 360 may determine a second image having the highest contrast from among the plurality of second images. If an input for obtaining an image is received after determining the second image, the processor 360 may identify the posture of the electronic device 101 stored in association with the determined second image. The processor 360 may display, on the display 310, guide information facilitating the user to change the current posture of the electronic device 101 to the identified posture of the electronic device 101. However, a method of determining the quality of each of the plurality of second images is not limited to the method of comparing contrast between the plurality of second images. As another example, the processor 360 may identify a user input corresponding to each of the plurality of second images (e.g., an input for transmitting the second image to the external electronic device 101 or an input for deleting the second image stored in the memory 350). The processor 360 may give a high priority to the second image corresponding to the input for transmission to the external electronic device (e.g., the electronic device 102, the electronic device 104, and/or the server 108) (or increase the score set in the second image), and give a lower priority to the second image corresponding to the input for deleting the second image stored in the memory 350 (or reduce the score set in the second image). The processor 360 may determine the second image having the highest rank (or highest score) from the plurality of second images. If an input for obtaining an image is received after determining the second image, the processor 360 may identify the posture of the electronic device 101 stored in association with the determined second image. The processor 360 may display, on the display 310, guide information facilitating the user to change the current posture of the electronic device 101 to the identified posture of the electronic device 101. However, a user input used to determine the quality of each of the plurality of second images is limited to the input for transmitting the second image to the external electronic device 101 and the input for deleting the second image stored in the memory 350.

Figure 14:
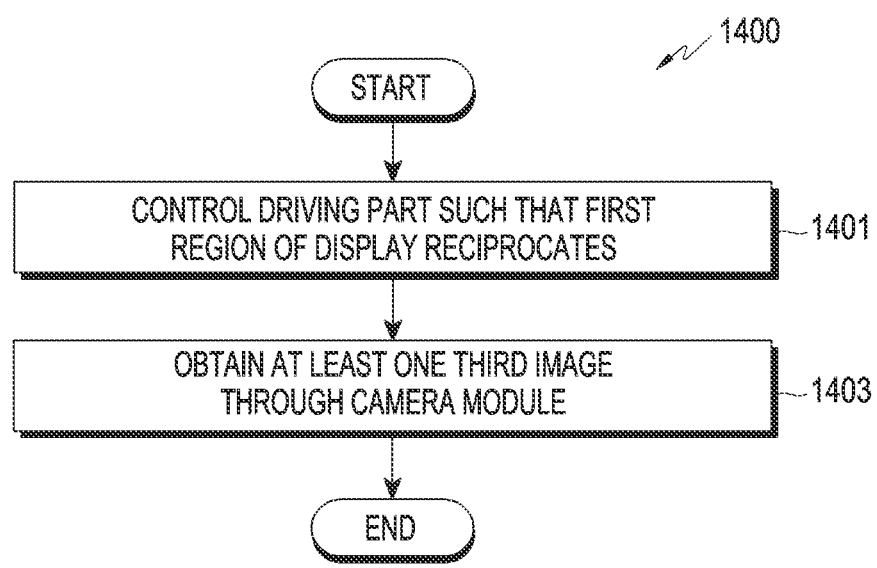
FIG. 14 is a flowchart illustrating a method of providing an image according to an embodiment of the disclosure.

FIG. 14 is a flowchart illustrating a method of providing an image according to an embodiment of the disclosure.

Figure 15:
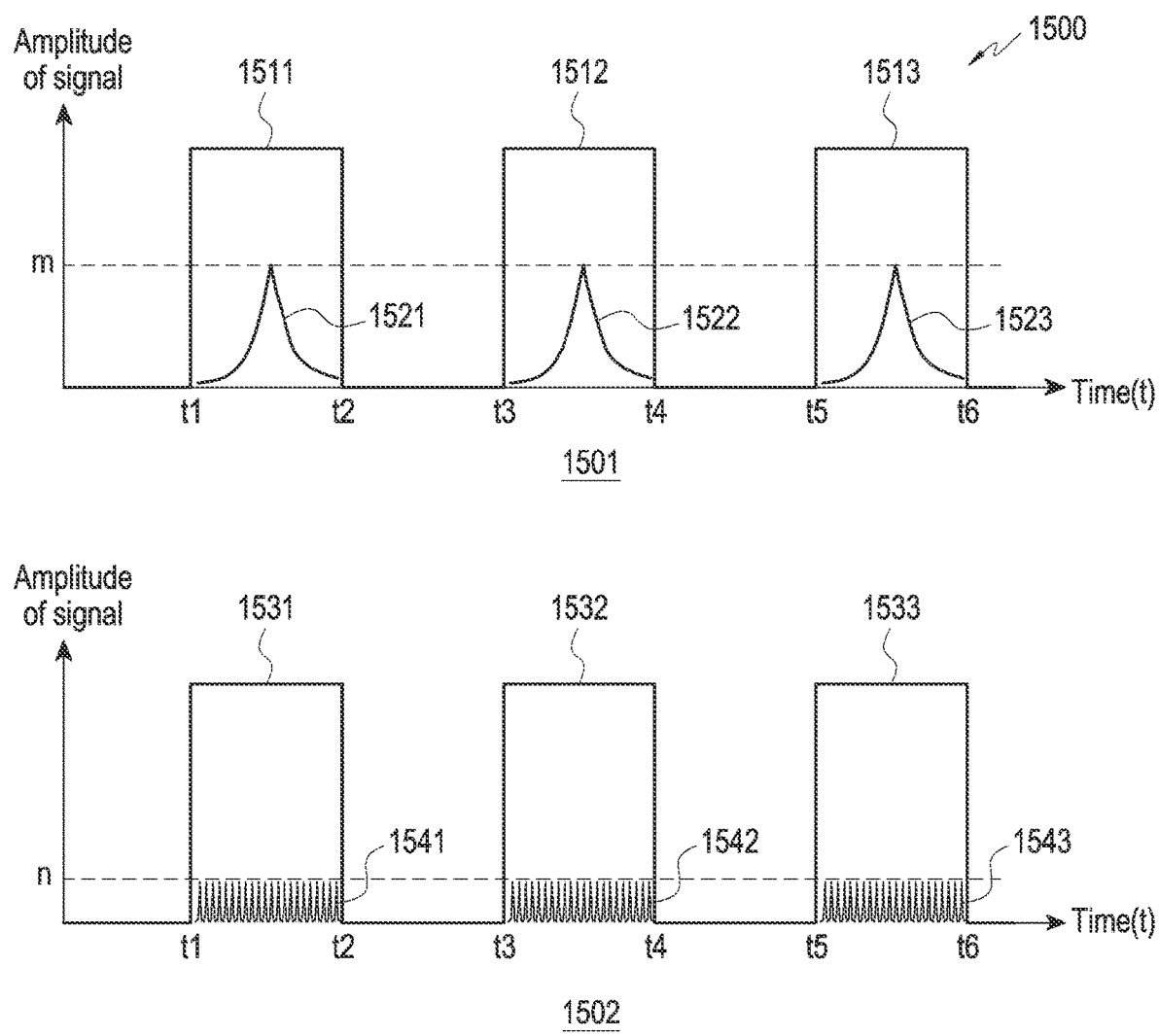
FIG. 15 is a diagram illustrating a method of providing an image according to an embodiment of the disclosure.

FIG. 15 is a diagram illustrating a method of providing an image according to an embodiment of the disclosure.

Referring to FIGS. 14 and 15 depicting flowcharts 1400 and diagram (1500) respectively, in operation 1401, in an embodiment, a processor 360 may control a driving part 320 such that a first region (UDC region 410) of a display 310 reciprocates (vibrates).

Since operation 1401 is at least partially the same as or similar to operation 601 in FIG. 6, a detailed description thereof will be omitted.

In operation 1403, in an embodiment, the processor 360 may obtain at least one third image through the camera module 330 while the UDC region 410 is vibrating.

In an embodiment, the processor 360 may obtain at least one third image through the camera module 330 while the UDC region 410 is vibrating for a period less than the period for which the camera module 330 obtains an image (e.g., the image sensor 332). For example, in the case where the period for which the camera module 330 obtains an image is 1/30 seconds, the processor 360 may obtain at least one third image through the camera module 330 while the UDC region 410 is vibrating for a period of 1/60 seconds.

In an embodiment, the processor 360 may perform a post-processing operation including an operation of correcting brightness on the at least one obtained third image.

Although not shown in FIG. 14, in an embodiment, the processor 360 may display the at least one obtained third image on the display 310. However, the disclosure is not limited thereto, and the processor 360 may synthesize the at least one obtained third image and display the synthesized image on the display 310.

In an embodiment, at least one third image obtained through the camera module 330 while the UDC region 410 vibrates for a period less than the period for which the camera module 330 (e.g., the image sensor 332) obtains an image may have a higher quality than that of at least one fourth image obtained in the state in which the UDC region 410 is fixed.

In an embodiment, in reference numeral 1501 in FIG. 15, in the case where the UDC region 410 is fixed, signals 1521, 1522, and 1523 may indicate the diffracted optical signals received by one pixel of the image sensor 332 during the respective exposure times t1 to t2, t3 to t4, and t5 to t6 of the camera module 330 (e.g., optical signals diffracted by the elements disposed in the UDC region 410), and signals 1511, 1512, and 1513 may indicate non-diffracted optical signals received by one pixel of the image sensor 332 during the respective exposure times t1 to t2, t3 to t4, and t5 to t6 of the camera module 330. In an embodiment, one image may be obtained through the camera module 330 for each of the exposure times t1 to t2, t3 to t4, and t5 to t6 of the camera module 330.

In an embodiment, in reference numeral 1502 in FIG. 15, in the case where the UDC region 410 vibrates for a period less than the period for which the camera module 330 obtains an image, signals 1541, 1542, and 1543 may indicate the diffracted optical signals received by one pixel of the image sensor 332 during the respective exposure times t1 to t2, t3 to t4, and t5 to t6 of the camera module 330, and signals 1531, 1532, and 1533 may indicate non-diffracted optical signals received by one pixel of the image sensor 332 during the respective exposure times t1 to t2, t3 to t4, and t5 to t6 of the camera module 330.

In an embodiment, in the case where the UDC region 410 vibrates for a period less than the period for which the camera module 330 obtains an image, the diffracted optical signal may be dispersed to more pixels than the case where the UDC region 410 is fixed. For example, the diffracted optical signal in the case where the UDC region 410 vibrates for a period less than the period for which the camera module 330 obtains an image may be further uniformized (e.g., equalized), compared to the diffracted optical signal in the case where the UDC region 410 is fixed. Accordingly, comparing the signals 1521, 1522, and 1523 in reference numeral 1501 with the signals 1541, 1542, and 1543 in reference numeral 1502, the amplitude n of the signals 1541, 1542, and 1543 may be less than the amplitude m of the signals 1521, 1522, and 1523, and the frequency of the signals 1541, 1542, and 1543 may be higher than the frequency of the signals 1521, 1522, and 1523.

A method of providing an image in an electronic device 101 according to various embodiments may include controlling a driving part 320 of the electronic device 101 such that the first region reciprocates, the driving part being configured to reciprocate a first region, obtaining a plurality of first images through a camera module 330 of the electronic device 101, the camera module being configured to obtain an image using incident light passing through the first region, while the first region reciprocates, and obtaining a second image by synthesizing the plurality of first images.

In various embodiments, the method may include controlling the driving part 320 such that the first region vibrates in a vertical vibration form in which the first region vibrates in a direction perpendicular to a surface on which the display 310 is visually exposed to an outside and/or in a horizontal vibration form in which the first region vibrates in a direction parallel to the surface on which the display 310 is visually exposed to the outside.

In various embodiments, the vertical vibration form may include a first vertical vibration form in which the first region vibrates to be bent in a first direction perpendicular to a surface on which the display 310 is visually exposed to an outside, based on an edge of the first region, a second vertical vibration form in which the first region vibrates to be bent in the first direction, based on both ends of the first region, and/or a third vertical vibration form in which the first region linearly reciprocates in the first direction, and the horizontal vibration form may include a first horizontal vibration form in which the first region linearly reciprocates in a second direction parallel to the surface on which the display 310 is visually exposed to the outside and/or a second horizontal vibration form in which the first region linearly reciprocates in a third direction, which is different from the second direction and parallel to the surface on which the display 310 is visually exposed to the outside.

In various embodiments, the controlling of the driving part 320 may include controlling the driving part such that the first region reciprocates in at least one of the vertical vibration form, the first horizontal vibration form, or the second horizontal vibration form.

In various embodiments, the controlling of the driving part 320 may include selecting a vibration form in which the first region is to vibrate from among the at least one vibration form, based on a user input, and controlling the driving part 320 such that the first region vibrates in the selected vibration form.

In various embodiments, the controlling of the driving part 320 may include determining a quality of the second image, determining a vibration form in which the first region is to vibrate from among the at least one vibration form, based on the quality of the second image, and controlling the driving part 320 such that the first region vibrates in the selected vibration form.

In various embodiments, the method may further include obtaining information on a posture of the electronic device 101 through a sensor 340 of the electronic device 101 while the plurality of first images is obtained, determining a quality of the second image, and determining a posture of the electronic device 101 to be guided to a user when obtaining an image, based on the quality of the second image.

In various embodiments, the method may further include configuring a period for which the first region reciprocates and/or a period for which the camera module 330 obtains an image to obtain the plurality of first images in different states and/or positions of the first region for one period for which the first region reciprocates.

In various embodiments, the controlling of the driving part 320 may include controlling the driving part 320 such that the first region reciprocates for a period less than the period for which the camera module 330 obtains an image.

In various embodiments, the display 310 may include the first region and a second region other than the first region in the display 310, wherein the pixels per inch (PPI) of the first region may be less than the PPI of the second region.

In various embodiments, the controlling of the driving part 320 may include controlling a period for which the first region reciprocates, based on an exposure time of the camera module 330, ambient illuminance, and/or a mode in which the camera module 330 obtains an image.

In various embodiments, the controlling of the driving part 320 may include controlling reciprocating movement of the first region, based on whether or not a light source exists within an angle of view of the camera module 330.

In addition, the structure of data used in the above-described embodiment of the disclosure may recorded in a computer-readable recording medium through various means. The computer-readable recording medium may include a storage medium such as a magnetic storage medium (e.g., read only memory (ROM), a floppy disk, a hard disk, etc.) and an optically readable medium (e.g., compact disc read only memory (CD-ROM), digital versatile disc (DVD), etc.).

What is claimed is:
1. An electronic device comprising:
a display comprising a first region being capable of reciprocating;
a camera configured to obtain an image using incident light passing through the first region;
a driving part configured to reciprocate the first region; and at least one processor electrically connected to the display, the camera, and the driving part, wherein the at least one processor is configured to:
control the driving part such that the first region reciprocates,
obtain a plurality of first images through the camera while the first region reciprocates, and
obtain a second image by synthesizing the plurality of first images.

2. The electronic device of claim 1, wherein the at least one processor is further configured to control the driving part such that the first region vibrates in a vertical vibration form in which the first region vibrates in a direction perpendicular to a surface on which the display is visually exposed to an outside and/or in a horizontal vibration form in which the first region vibrates in a direction parallel to the surface on which the display is visually exposed to the outside.

3. The electronic device of claim 2,
wherein the vertical vibration form comprises:
a first vertical vibration form in which the first region vibrates to be bent in a first direction perpendicular to a surface on which the display is visually exposed to the outside, based on an edge of the first region,
a second vertical vibration form in which the first region vibrates to be bent in the first direction, based on both ends of the first region, and/or
a third vertical vibration form in which the first region linearly reciprocates in the first direction, and
wherein the horizontal vibration form comprises:
a first horizontal vibration form in which the first region linearly reciprocates in a second direction parallel to the surface on which the display is visually exposed to the outside and/or a second horizontal vibration form in which the first region linearly reciprocates in a third direction, which is different from the second direction and parallel to the surface on which the display is visually exposed to the outside.

4. The electronic device of claim 3, wherein the at least one processor is further configured to control the driving part such that the first region reciprocates in at least one vibration form from among the vertical vibration form, the first horizontal vibration form, or the second horizontal vibration form.

5. The electronic device of claim 4, wherein the at least one processor is further configured to:
select a vibration form in which the first region is to vibrate from among the at least one vibration form, based on a user input, and
control the driving part such that the first region vibrates in the selected vibration form.

6. The electronic device of claim 4, wherein the at least one processor is further configured to:
determine a quality of the second image;
determine a vibration form in which the first region is to vibrate from among the at least one vibration form, based on the quality of the second image; and
control the driving part such that the first region vibrates in the determined vibration form.

7. The electronic device of claim 4, further comprising a sensor,
wherein the at least one processor is further configured to:
obtain information on a posture of the electronic device through the sensor while the plurality of first images is obtained,
determine a quality of the second image, and
determine a posture of the electronic device, the posture to be used as guide provided to a user when obtaining an image, based on the quality of the second image.

8. The electronic device of claim 1, wherein the at least one processor is further configured to configure a period for which the first region reciprocates and/or a period for which the camera obtains an image to obtain the plurality of first images in different states and/or positions of the first region for one period for which the first region reciprocates.

9. The electronic device of claim 1, wherein the at least one processor is further configured to control a period for which the first region reciprocates, based on an exposure time of the camera, ambient illuminance, and/or a mode in which the camera obtains an image.

10. The electronic device of claim 1, wherein the at least one processor is further configured to control reciprocating movement of the first region, based on whether or not a light source exists within an angle of view of the camera.

11. A method of providing an image in an electronic device, the method comprising:
controlling a driving part of the electronic device such that a first region reciprocates, the driving part being configured to reciprocate a first region included in the electronic device;
obtaining a plurality of first images through a camera of the electronic device, the camera being configured to obtain an image using incident light passing through the first region while the first region reciprocates; and
obtaining a second image by synthesizing the plurality of first images.

12. The method of claim 11, wherein the controlling of the driving part comprises controlling the driving part such that the first region vibrates in a vertical vibration form in which the first region vibrates in a direction perpendicular to a surface on which a display of the electronic device is visually exposed to an outside and/or in a horizontal vibration form in which the first region vibrates in a direction parallel to the surface on which the display is visually exposed to the outside.

13. The method of claim 12,
wherein the vertical vibration form comprises:
a first vertical vibration form in which the first region vibrates to be bent in a first direction perpendicular to a surface on which the display is visually exposed to the outside, based on an edge of the first region,
a second vertical vibration form in which the first region vibrates to be bent in the first direction, based on both ends of the first region, and/or
a third vertical vibration form in which the first region linearly reciprocates in the first direction, and
wherein the horizontal vibration form comprises a first horizontal vibration form in which the first region linearly reciprocates in a second direction parallel to the surface on which the display is visually exposed to the outside and/or a second horizontal vibration form in which the first region linearly reciprocates in a third direction, which is different from the second direction and parallel to the surface on which the display is visually exposed to the outside.

14. The method of claim 13, wherein the controlling of the driving part comprises controlling the driving part such that the first region reciprocates in at least one vibration form from among the vertical vibration form, the first horizontal vibration form, or the second horizontal vibration form.

15. The method of claim 14, wherein the controlling of the driving part comprises:

selecting a vibration form in which the first region is to vibrate from among the at least one vibration form, based on a user input; and controlling the driving part such that the first region vibrates in the selected vibration form.

16. The method of claim 14, wherein the controlling of the driving part comprises:

determining a quality of the second image;

determining a vibration form in which the first region is to vibrate from among the at least one vibration form, based on the quality of the second image; and controlling the driving part such that the first region vibrates in the determined vibration form.

17. The method of claim 14, further comprising:

obtaining information on a posture of the electronic device through a sensor of the electronic device while the plurality of first images is obtained;

determining a quality of the second image; and determining a posture of the electronic device, the posture to be used as a guide provided to a user when obtaining an image, based on the quality of the second image.

18. The method of claim 11, further comprising configuring a period for which the first region reciprocates and/or a period for which the camera obtains an image to obtain the plurality of first images in different states and/or positions of the first region for one period for which the first region reciprocates.

19. An electronic device comprising:

a display comprising a first region being capable of reciprocating and a second region having a lower pixels per inch (PPI) than a PPI of the first region;

a camera disposed under the first region and configured to obtain an image using incident light passing through the first region;

a wire configured to connect the first region and the second region;

a driving part configured to reciprocate the first region;

an elastic member configured to allow the first region to move; and a support member to which the elastic member and/or the driving part are attached.

20. The electronic device of claim 19, wherein the elastic member is disposed under the driving part or disposed on a same surface as the driving part.

* * * * *